United States Patent
Lipovetskaya et al.

(10) Patent No.: US 7,929,198 B2
(45) Date of Patent: Apr. 19, 2011

(54) ELECTRO-OPTIC DISPLAY

(75) Inventors: Yelena Lipovetskaya, Santa Barbara, CA (US); Brian Gobrogge, Grand Rapids, MI (US)

(73) Assignee: CBRITE Inc., Goleta, CA (US)

( * ) Notice: Subject to any disclaimer, the term of this patent is extended or adjusted under 35 U.S.C. 154(b) by 488 days.

(21) Appl. No.: 11/973,883

(22) Filed: Oct. 9, 2007

(65) Prior Publication Data

US 2008/0100907 A1    May 1, 2008

Related U.S. Application Data

(60) Provisional application No. 60/850,883, filed on Oct. 10, 2006.

(51) Int. Cl.
    G02B 26/00    (2006.01)
(52) U.S. Cl. .................................................. 359/296
(58) Field of Classification Search .......... 359/296–298; 345/107–109, 55, 84–85
    See application file for complete search history.

(56) References Cited

U.S. PATENT DOCUMENTS

| | | | |
|---|---|---|---|
| 4,126,854 A | 11/1978 | Sheridon | |
| 4,143,103 A | 3/1979 | Sheridon | |
| 4,261,653 A | 4/1981 | Goodrich | |
| 4,438,160 A | 3/1984 | Ishikawa et al. | |
| 4,810,431 A | 3/1989 | Leidner | |
| 5,344,594 A | 9/1994 | Sheridon | |
| 5,708,525 A | 1/1998 | Sheridon | |
| 5,737,115 A | 4/1998 | Mackinlay et al. | |
| 5,751,268 A | 5/1998 | Sheridon | |
| 5,754,332 A | 5/1998 | Crowley | |
| 5,760,761 A | 6/1998 | Sheridon | |
| 5,767,826 A | 6/1998 | Sheridon | |
| 5,777,782 A | 7/1998 | Sheridon | |
| 5,808,783 A | 9/1998 | Crowley | |
| 5,815,306 A | 9/1998 | Sheridon | |
| 5,892,497 A | 4/1999 | Robertson | |
| 5,914,805 A | 6/1999 | Crowley | |
| 5,917,646 A * | 6/1999 | Sheridon | 359/296 |
| 5,930,026 A | 7/1999 | Jacobson et al. | |

(Continued)

FOREIGN PATENT DOCUMENTS

EP    0 935 230    11/1999

(Continued)

OTHER PUBLICATIONS

International Search Report and Written Opinion mailed on Apr. 17, 2008 for PCT/US2007/080842.

(Continued)

*Primary Examiner* — Hung X. Dang
*Assistant Examiner* — Vipin M Patel
(74) *Attorney, Agent, or Firm* — Weaver Austin Villeneuve & Sampson LLP

(57) ABSTRACT

An electro-optic display includes a "matrix" for confining moving elements of the display (e.g., rotating or twisting elements). The matrix (or at least the viewable portions thereof) may have a high reflectivity, comparable to that of white paper. This results in an overall "whiter" or brighter display. The matrix may include channels to facilitate inter-cell fluid transport and high-density element packing. In some cases, the matrix elements provide a hexagonal arrangement of cells for holding the rotating elements. The rotating elements of the display may be electrically and optically anisotropic hemispherically coated spheres. The hemispherical coating typically provides the necessary charge to create electrical anisotropy.

60 Claims, 21 Drawing Sheets

U.S. PATENT DOCUMENTS

| | | | |
|---|---|---|---|
| 5,989,629 A | 11/1999 | Sacripante et al. | |
| 6,054,071 A | 4/2000 | Mikkelsen, Jr. | |
| 6,055,091 A | 4/2000 | Sheridon et al. | |
| 6,067,185 A | 5/2000 | Albert et al. | |
| 6,162,321 A | 12/2000 | Silverman | |
| 6,222,513 B1 * | 4/2001 | Howard et al. | 345/84 |
| 6,428,868 B1 | 8/2002 | Sheridon et al. | |
| 6,445,490 B1 | 9/2002 | Chopra et al. | |
| 6,459,200 B1 | 10/2002 | Moore | |
| 6,462,859 B1 * | 10/2002 | Bastiaens et al. | 359/296 |
| 6,487,002 B1 | 11/2002 | Biegelsen | |
| 6,498,674 B1 * | 12/2002 | Sheridon | 359/296 |
| 6,577,432 B2 * | 6/2003 | Engler et al. | 359/296 |
| 6,672,921 B1 | 1/2004 | Liang et al. | |
| 6,727,881 B1 | 4/2004 | Albert et al. | |
| 6,750,844 B2 * | 6/2004 | Nakanishi | 345/107 |
| 6,788,452 B2 | 9/2004 | Liang et al. | |
| 6,795,229 B2 | 9/2004 | Liang et al. | |
| 6,839,158 B2 | 1/2005 | Albert et al. | |
| 6,850,355 B2 | 2/2005 | Liang et al. | |
| 6,956,690 B2 | 10/2005 | Yu et al. | |
| 6,970,154 B2 | 11/2005 | Sheridon | |
| 6,987,603 B2 | 1/2006 | Paolini, Jr. et al. | |
| 7,057,599 B2 | 6/2006 | Engler et al. | |
| 7,071,895 B2 | 7/2006 | Wampler | |
| 7,075,502 B1 | 7/2006 | Drzaic et al. | |
| 7,116,466 B2 | 10/2006 | Whitesides et al. | |
| 7,167,155 B1 | 1/2007 | Albert et al. | |
| 7,177,067 B1 | 2/2007 | Sakamoto | |
| 7,184,197 B2 | 2/2007 | Liang et al. | |
| 7,271,947 B2 | 9/2007 | Liang et al. | |
| 7,369,299 B2 * | 5/2008 | Sakurai et al. | 359/296 |
| 2002/0106847 A1 | 8/2002 | Kazlas et al. | |
| 2002/0140133 A1 | 10/2002 | Moore | |
| 2004/0179146 A1 | 9/2004 | Nillson | |
| 2006/0050363 A1 | 3/2006 | Chopra et al. | |
| 2009/0231251 A1 * | 9/2009 | Shoji | 345/87 |
| 2010/0035377 A1 | 2/2010 | Gobrogge et al. | |
| 2010/0097687 A1 | 4/2010 | Lipovetskaya et al. | |

FOREIGN PATENT DOCUMENTS

| | | |
|---|---|---|
| WO | WO/02/29485 | 4/2002 |
| WO | WO2008/045891 | 4/2008 |
| WO | WO2008/080066 | 7/2008 |

OTHER PUBLICATIONS

U.S. Appl. No. 60/850,883, filed Oct. 10, 2006.
U.S. Appl. No. 60/876,767, filed Jan. 22, 2006.
International Search Report, 5 pages and Written Opinion, 6 pages, mailed May 15, 2008, filed on Dec. 21, 2007 for PCT/US2007/088567.

* cited by examiner

SECTION A-A

ELECTRO-OPTIC DISPLAY

CROSS-REFERENCE TO RELATED APPLICATIONS

This application claims priority under 35 USC 119(e) from U.S. Provisional Patent Application No. 60/850,883 naming Lipovetskaya et al. as inventors, titled "Electro-Optic display" filed Oct. 10, 2006, which is incorporated by reference in its entirety and for all purposes.

FIELD OF THE INVENTION

The present invention relates to visual displays. Specifically, it relates to electro-optic displays. More specifically, it relates to front plane designs for electro-optic displays.

BACKGROUND OF THE INVENTION

Visual displays that make use of ambient light to illuminate their pixels (reflective) and that produce an image that is indefinitely stable in the absence of electrical input are often referred to as electronic paper, since they mimic some of the most advantageous properties of paper. Just like white paper that reflects and scatters incident light and does not require additional light sources for viewing the images printed upon it, electronic paper displays reflect and scatter ambient light in the white or light colored areas (often image-free areas) and absorb light in the black or dark color areas (often where the image appears). Thus, an electronic paper display can provide images that are viewable in the absence of backlight or pixel emission illumination (e.g., light emitting diode pixels). The absence of backlight makes such displays more pleasing to the eye, since the appearance of an image on such display resembles the appearance of an image on a sheet of paper. Further, since a backlight source is not required for these displays, they can be manufactured in less bulky, thin forms that may also possess some paper-like flexibility.

Electronic paper displays may also be bistable. Bistability refers to the ability of an image to remain stable in the absence of external stimuli (e.g., an applied electric potential). In bistable displays the states of individual pixels (e.g., whether the pixels are light or dark) remain intact for long periods of time when no external potential is applied to the display. Therefore, images can be stored on bistable displays for a prolonged time without the need for continuous application of power, much like images stored on paper. This makes bistable displays especially appealing for portable-display applications. Further, since power is consumed by bistable displays only when the image is changed, these displays are more economical for some applications than conventional LCD and CRT displays. In CRT displays, for instance, the image needs to be constantly refreshed. While low refresh rates can conserve some power, this often results in flickering of the display and consequent eye strain of the viewer.

The image on the electronic paper display can be changed when desired, allowing a variety of applications for such displays. In one example, such displays serve as "reusable paper" for displaying still images. In other examples, they are used to display real-time moving imagery in video applications.

The first electronic displays with paper-like properties were developed in the 1970s at Xerox's Palo Alto Research Center. These displays, often referred to as "gyricon" displays, are based on rotation of optically and electrically anisotropic spheres embedded in an elastomer. In one example of a gyricon display, each sphere is composed of negatively charged black wax or plastic on one side and positively charged white wax or plastic on the other side. Each sphere is suspended in a dielectric fluid contained within a cavity formed in a plasticized elastomer. Each sphere is free to rotate in the fluid so that it could turn with black or white side to the viewer, thus providing a pixel with a black or white appearance. When an appropriate voltage is applied to the electrodes addressing selected spheres, the spheres rotate in accordance with their dipole moment and display an image to the viewer.

Gyricon technology, however, failed to produce image quality comparable to that of images printed on paper. In particular, gyricon displays did not possess the high reflectance of white paper, therefore providing low-contrast images. Gyricon displays also had limited environmental stability, because plasticized polymer was not capable of withstanding high-temperature or high-humidity conditions. Further, only few dielectric fluids were suitable for use in gyricon displays, since dielectric fluid in gyricon was serving both as a polymer plasticizer and as a rotation media and therefore had to possess properties suitable for both of these applications.

The brightness and contrast of displayed images is primarily determined by the maximum reflectance that a display may attain. The overall reflectance of the display is influenced by the quality of optically and electrically anisotropic spheres as well as by optical properties of the material filling the gaps between individual spheres. Although in improved versions of gyricon, described in U.S. Pat. No. 5,754,332 issued to Crowley et al., these gaps are minimized by employing a closely packed monolayer of bichromal spheres, this improvement was still very far from sufficient to approach the paper-like reflectance of about 85%. Even in a closely packed monolayer there remains some elastomer or matrix material occupying gaps between the spheres, which reduces the observed reflectance of the display and, hence, the contrast and brightness of displayed images. Since gyricon technology largely relies on swelling of elastomer to encapsulate the rotating spheres, the portions of elastomer filling the interstitial regions between the spheres, typically enlarge upon swelling, and absorb a significant amount of light, even when a closely packed monolayer of spheres is employed.

U.S. Pat. No. 5,815,306 issued to Sheridon et al. describes an improved gyricon display having an "eggcrate" matrix for holding individual spheres. The matrix provides a geometrically ordered array of cavities for containing the spheres, with one sphere residing in each cavity. The matrix is used in order to align auxiliary optical devices with the spheres, so that the display can function in a light transmission mode, transmitting or obscuring the passage of light so as to create an image. Such a matrix, although useful as a holding and aligning element, does not address the problem of low reflectance in the areas between the spheres, and, consequently, does not improve the contrast and brightness of the display.

Therefore, there is a need for an electronic paper display that can provide high-contrast images. Preferably, such display will have an overall reflectance that is comparable to reflectance of paper. It should be suitable for viewing both still and moving imagery, and should allow fabrication in thin and flexible forms. In addition, such display should preferably be robust and environmentally stable, e.g., it should be capable to withstand high-temperature and high-humidity conditions.

SUMMARY

The present invention provides various improvements over known electronic paper, and particularly over known gyricon displays. Some of these improvements reside in the use of an inventive "matrix" for confining individual rotating or twisting elements of the display. For example, the matrix (or at least the viewable portions thereof) may have a high reflectivity, comparable to that of white paper. This results in an overall "whiter" or brighter display. Other examples of improvements include matrix designs with channels to facilitate inter-cell fluid transport and high-density element packing. Some of these improvements derive from improved fabrication techniques which will be described herein. Further, other improvements reside in the use of coated rotating elements (e.g., hemispherically coated opaque spheres). The coating typically imparts an electrical charge to the elements, and thus creates electrical anisotropy.

In one aspect, the invention provides a front plane for an electro-optic display. In one embodiment, the front plane includes a first side adapted for electrical communication with a backplane and at least one electrode on a second side of the front plane opposite to the first side. Further, the front plane includes a matrix having a plurality of cells facing a viewable surface of the front plane and interstitial regions outside the cells also facing the viewable surface of the front plane, where the interstitial regions have a first color. The front plane further includes a plurality of optical elements disposed in the plurality of the cells of the matrix. The optical elements have the first color for display when a pixel of the electro-optic display is in a first electrical state.

In one embodiment, a front plane for an electro-optic display includes a first side adapted for electrical communication with a backplane and at least one electrode on a second side of the front plane opposite said first side. The front plane further includes a matrix having a plurality of cells defined by walls in the matrix. Further, a plurality of optically and electrically anisotropic elements are disposed in the plurality of matrix cells. The optically anisotropic elements have at least first opaque exterior region of a first color and a second opaque exterior region of a second color. It is understood that the interior portions of the elements can have the same or a different color (and material) from the exterior portions. In different embodiments solid or hollow optically anisotropic elements may be used. The front plane further includes a fluid provided in the matrix cells, such that the optically anisotropic elements can rotate from a first orientation displaying the first color to a second orientation displaying a second color when an electric field is applied to their cells.

In yet another embodiment, a front plane comprises a light colored matrix having a plurality of cells defined by walls in the matrix. The front plane also comprises a plurality of optically anisotropic elements disposed in the plurality of cells, where the optically anisotropic elements have at least two colors. When these elements are in the first orientation the light color of the elements is presented to the first side of the front plane and when these elements are in the second orientation a darker color is presented to the first side of front plane.

In another aspect, the invention provides a rotating element display. In one embodiment, the display includes a back plane containing a plurality of electrodes distributed in two dimensions on the back plane, wherein each of these electrodes allows independent control of a discrete region of the display. In some embodiments the back plane electrodes may be substantially coplanar. The display also includes a front plane having two sides, wherein one side is connected to or is proximate the back plane. At least one electrode is located on another side of the front plane opposite the back plane. The front plane includes a matrix which provides a plurality of cells defined by walls in the matrix and which has at least one channel through at least some of the walls connecting at least some of the cells with one another. The front plane also includes a plurality of optically and electrically anisotropic elements disposed in the cells of the matrix. The cells are filled with fluid so that the elements can twist or rotate from a first orientation to a second orientation within their respective cells when an electric field is applied to the cells.

In one embodiment the optically anisotropic elements have at least two colors. Typically, when these elements are in the first orientation one color is presented to the first side of the front plane and when said elements are in the second orientation a different color is presented to the first side of the front plane. Preferably, one color of the at least two colors is lighter than a second color of the at least two colors. For example, the at least two colors may be black and white. In one embodiment the rotating elements are spheres that may have an average diameter of about 25-150 micrometers.

In some embodiments, the matrix has multiple channels connecting multiple cells along the path. For example, these channels can be substantially parallel to one another and can be connecting cells in rows. In other embodiments the channels may be intersecting, e.g., they can be substantially perpendicular to each other. Preferably, these channels are arranged so as to allow the dielectric fluid to be drawn into the front plane during its assembly. In one example, at least some of the channels have a cross sectional area of at least about 5% of the cross sectional area of the cell. In some embodiments the walls of the cells are comprised of "posts", and the fluid is allowed to flow freely in the channels between the posts. In some embodiments, the matrix is designed such that at least one cell in the matrix is in fluid communication with each of its adjacent cells. In some embodiments the matrix includes a plurality of regions, wherein the cells within the same region are in fluid communication with one another, and the cells from different regions are separated from one another by a wall preventing fluid communication between adjacent regions of the matrix. For example, a wall can separate regions every 2-100 (e.g., every 5-50) rows of cells. Such matrix design minimizes the chances for failure of the display.

In some embodiments the matrix comprises walls having different heights. For example, the matrix can include supporting walls and arranging walls, wherein the supporting walls have a height that is at least equal to a height or a diameter of an optically anisotropic element, and wherein the arranging walls have a height of less than about 80% (e.g. less than about 50%) of the height (or diameter) of an optically anisotropic element.

In some embodiments, the matrix is designed such that the height of the cells allows for a translational movement of an optically anisotropic element in a cell in a direction defined by the first and second sides of the front plane (typically to the viewer and away from the viewer). For example, the height of the cell may be at least 1.1 (e.g., 1.5) times greater than the height or a diameter of an optically anisotropic element residing in a cell.

The matrix can host one optically anisotropic element per cell, or can provide cells large enough to host a plurality of elements. In some embodiments, the matrix can host a plurality of elements which can be disposed as a monolayer. In other embodiments, several layers of optically anisotropic elements may reside in one cell. For example, between about 2-5, preferably about 2-3 layers can reside in the cell.

In order to maximize reflectance of the display, the cells of the matrix can be arranged in a hexagonal close packed pattern, so as to minimize interstitial area between the rotating elements disposed in the matrix cells. The interstitial area can be further minimized when the matrix walls separating adjacent cells are thin. For example, the walls that define cells of the matrix may have a minimum width at regions separating adjacent cells of at most about 45 micrometers, and at most 5 micrometers in certain embodiments. The appropriate wall thicknesses may correspond to high aspect ratios of the matrix walls. For example, matrix walls at positions of their greatest height and least width, can have an average aspect ratio of at least about 5:1 (height to width), preferably at least about 8:1. It is preferable, that an area projected by the cells on the first side of the front plane occupies at least 65% of a corresponding area of the first side. It is also preferable, that at least a portion of the matrix visible through the first side of the front plane has a light color. For example, the front plane of the display may have a diffuse reflectance of at least about 30%.

In other embodiments, it is advantageous to use a square close pack design in a matrix. The square pack design can achieve a good fill factor and can also make use of the walls with a lower aspect ratio. Therefore such design can be more easily manufactured, and can be structurally more stable than a hexagonal design having high aspect ratio walls. In some embodiments, the walls (e.g., posts) of a matrix in a square pack design have an aspect ratio of less than about 5:1, e.g., about 4:1.

In some embodiments the advantageous properties of hexagonal and square pack designs are combined, by providing a matrix having a first region in which the cells are arranged in a square close packed pattern and a region in which the cells are arranged in a hexagonal close packed pattern.

In another aspect, the invention provides a method of assembling a front plane of a twisting element or rotating element display. A matrix having a support surface, a plurality of cells defined by walls on the support surface in the matrix and at least one channel through at least some of the walls and connecting at least some of the cells with one another, is provided. A plurality of optically anisotropic elements is disposed in the plurality of cells of the matrix. At least one electrode on a side of the matrix opposite the support surface is provided. A dielectric fluid is drawn into the cells of the matrix through the at least one channel. The front plane produced by this method allows the elements to twist from a first orientation to a second orientation within their respective cells when an electric field is applied to the cells. At an appropriate point in the fabrication process, the front plane may be attached to the back plane. The front plane may be assembled by coating one side of the front electrode layer with an adhesive (e.g., with an optically transparent heat-activated adhesive); contacting the coated electrode side with the matrix containing the optically anisotropic elements; and attaching the electrode to the matrix at the side comprising cell openings with the adhesive. When heat-activated adhesive is used, the attachment of the matrix to the front electrode is accomplished by heating the assembly comprising the matrix and the electrode.

In another aspect, the invention provides a method for loading elements into cells of a matrix of a partially-fabricated electro-optic display. In one embodiment the method involves forming a suspension of the elements in a fluid, wherein the fluid is inert towards an exterior material of the elements; contacting the suspension with an absorbent transfer member (e.g., a brush) to load the transfer member with a plurality of elements; contacting the matrix with the loaded transfer member to transfer the elements into the cells of the matrix; and removing excess elements from the surface of the matrix (e.g., with a second brush). The method can be applied to load very small elements (e.g., elements with a diameter less than about 1 mm, less than 0.15 mm, e.g., about 50 μm) into small matrix cells. For example, the elements can be transferred such that one optically anisotropic element occupies each matrix cell.

In another aspect, the invention provides a method of using the rotating element display. The rotating element display is suitable for viewing both still and moving images. The images are created by providing a plurality of signals to at least some of the electrodes of the display, so that a potential difference between electrodes is created in response to these signals. The optically and electrically anisotropic elements are rotated in response to said potential difference from a first orientation to a second orientation. In one embodiment, one color is presented to the first side of the front plane when the element is in first orientation and a different color is presented to the first side of the front plane when the element is in second orientation. The signals provided to electrodes can selectively address specific electrodes, wherein each electrode allows independent control of a discrete region of the display. Therefore, an image can be created in response to these signals. In some embodiments, the image thus created will have high contrast due to high reflectance of the inventive display.

These and other features and advantages of the invention will be described in more detail below with reference to the associated drawings.

BRIEF DESCRIPTION OF THE DRAWINGS

FIGS. 5-12 provide dimensions for different matrix elements as an example. The dimensions are shown in rectangular blocks and refer to dimensions in micrometers, except for FIG. 11B, where the dimensions are shown in millimeters. It is understood that drawings are used for illustration purposes, and that the invention is not limited to particular dimensions shown.

DETAILED DESCRIPTION OF A PREFERRED EMBODIMENT

Introduction and Overview

Figure 1:
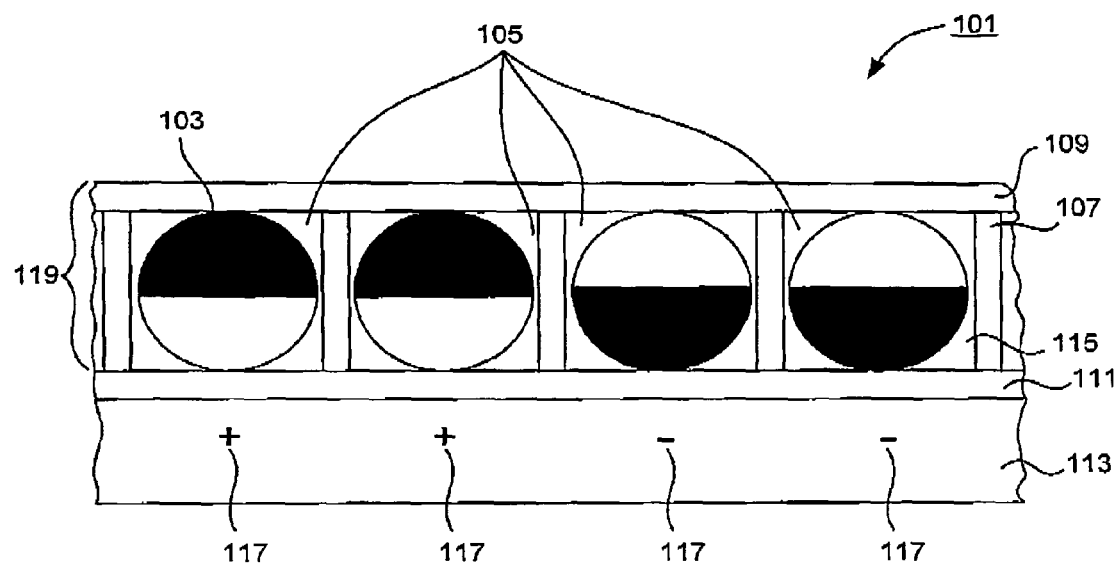
FIG. 1 illustrates a cross-sectional side view of a twisting element display in accordance with one embodiment of the present invention.

Electro-optic displays of present invention may possess a number of advantageous characteristics that may compare favorably to gyricon electronic paper. These displays may provide high brightness and contrast images (due, for example, to specific properties of the matrix). They also may possess high resolution due to, for example, small pixel size. Further, the displays of present invention may be manufactured from environmentally robust materials, resulting in environmentally stable displays (e.g., displays withstanding high temperature and high humidity conditions). The design of these displays allows for easy display manufacturing, making use, in certain embodiments of a channel in the matrix during display assembly. Display assembly methods are also provided in some aspects of present invention.

The simplicity of electro-optic displays provided by this invention minimizes the number of components, and thus cost of display manufacturing. In some embodiments, the displays of present invention do not require backlight, and thus reduce the power consumption during display operation.

As explained, electrically anisotropic elements having a non-uniform charge distribution on their surfaces can be caused to move in discrete electric fields. This movement can be coupled with a change in the observed optical properties of the element, so that the viewer will observe different appearance of the element (e.g. black or white) depending on the direction and the strength of the field. Appropriately ordered and contained addressable arrays of such elements can be used as electronic paper displays since they do not require backlight and can be fabricated in thin and flexible forms. They are also often bistable, thus providing images that are stable in the absence of external electric input.

Since these displays rely on response of elements to an electric stimulus to produce an optical effect, they are sometimes referred to as electro-optic displays. Electro-optic displays in which elements rotate to produce optical effects are sometimes referred to as twisting element or rotating element displays. While element movement can be both translational and rotational, it is sometimes advantageous to constrain the movement to rotational movement only (or rotational movement coupled with minimal translational movement). As explained more fully below, this is because translation requires a space for the elements to translate, which generally means that the electrodes driving movement of the elements must have a greater separation distance (in comparison to the case where the elements are constrained to rotation only). This greater separation requires a corresponding greater driving voltage between the electrodes to effect rotation. Displays limited to rotational movement generally require smaller driving voltages and result in faster response times.

Therefore, in certain embodiments, twisting element displays of this invention employ only rotational movement of electrically anisotropic bichromal spheres. It should be noted, however, that in some embodiments of the present invention, there may exist a translational component to the movement of the elements, in conjunction with the rotational component. Rotating elements of this invention are typically spherical in shape. This allows the use of simple matrix designs for housing the rotating elements. For example, the matrix may comprise an array of generally cylindrical cells to house the rotating elements. It should be understood, however, that in certain embodiments non-spherical rotatable display elements, such as cylinders, may be used, and a matrix with rectangularly-shaped cells may be appropriate.

Referring to FIG. 1, a cross-sectional view of a display structure in accordance with one embodiment of the present invention is illustrated. The viewable direction is indicated by an arrow 101. Electrically anisotropic bichromal spheres 103 are rotatably disposed within cells 105 defined by matrix walls 107, a front electrode layer 109, and a matrix base 111. A backplane 113 is attached to the matrix base 111. The spheres are immersed in fluid 115, so that they can freely rotate when an electric field is applied. A plurality of electrodes 117 (no details depicted) are distributed in two dimensions on the backplane 113, so that each electrode can independently control a discrete region of the display, typically a single cell and sphere. Alternatively, one electrode can control multiple spheres. In one example, each sphere and associated backplane electrode together corresponds to one pixel on the display.

The front electrode layer 109 typically contains one or more electrodes and is usually composed of a conductive transparent material, such as indium/tin oxide (ITO) coated on polyethyleneterephthalate (PET). Other conductive transparent materials suitable for front electrode layer include conductive polymers (e.g. PEDOT (poly(3,4-ethylenedioxythiophene)), or PSS:PEDOT (poly(3,4-ethylenedioxythiophene) doped with poly(styrenesulfonate)), carbon nanotubes, doped oxide materials, such as aluminum/zinc oxide, and the like. These materials can be used either alone or as coatings on transparent substrates, such as PET. The front electrode layer should, preferably, have very high light transmissivity. For example, transmissivity of greater than about 82%, preferably greater than about 85% is preferred. ITO-PET films with these transmissivity properties are commercially available from a number of suppliers, such as CPFilms Inc. of Fieldale, Va. and Sheldahl Inc. of Northfield, Minn. Typically, the front electrode layer is a single sheet of electrode material covering all or a significant fraction of the pixels (and rotating elements) in the display. This is in distinction from the backplane electrodes, where each electrode is associated with a single pixel. The potential differential between the front and back electrodes creates the necessary electric field for rotation of the spheres. In some embodiments, however the front electrode layer may include a plurality of electrodes, wherein each electrode may address individual pixels or individual rotating elements of the display. Note that the assembly 119 is usually referred to as the "front plane" of the device and includes the front electrode layer 109, the matrix, the spheres, and the fluid.

In one example, the bichromal spheres 103 have positively charged black hemispherical coating, while the remaining hemisphere is white and uncharged (or negatively charged). When an appropriate potential difference is applied between the electrodes on the back and front planes, the sphere in a pixel element will rotate so as to align its charges with the applied electric field, thereby presenting a black or white hemisphere to the viewer. The rotation between states is preferably by about 180±15°, so that a black or a white hemisphere is fully visible.

In selected embodiments, spheres having more than two optically different segments or spheres wherein optical properties alternate from segment to segment, may be used. For example, spheres having different-color quadrants or thirds may be used. For these spheres, of course, the degree of rotation should correspond to the optical pattern of the sphere. For example a sphere having different-color quadrants may be rotated to about 90, 180, or 270° depending on the color that needs to be presented to the viewer.

Incident light falls onto the display from the direction shown by arrow 101. After it passes through the transparent front electrode layer, it is absorbed or reflected by the spheres, depending on the hemisphere that is presented to the viewer. Light is absorbed on the array of black hemispheres and is reflected by the white hemispheres, thereby creating a black image on a white background. If desired, it is possible to produce a gray image, on a white background. A gray image can be produced, for example, if selected spheres are not completely rotated. In this case the viewer will see parts of both black and white surfaces of individual spheres, so that an impression of gray color will be created. Incomplete rotation of the spheres can be achieved by applying smaller voltages than those needed for 180° rotation or by applying voltage in pulses of short duration, e.g., by pulse width modulation (PWM) methods Other methods of creating gray images can be used as will be recognized by those skilled in the art. These methods are applicable not only for creating gray images, when black and white hemispherically coated spheres are used, but they can be also employed to rotate a multi-colored sphere to a specific degree that is different from 180°. For example spheres having quadrants or thirds of different color can be rotated by 90 or 120° by using pulse width modulation methods.

Light falling into the interstices between the spheres (or other rotational element) may be reflected, absorbed, or partially absorbed (depending on the optical properties of the displayed interstitial portions of the matrix). The optical properties of the displayed region occupied by the matrix are generally not subject to variable control. With this in mind, aspects of the invention, which will be describes shortly, pertain to careful choice of the optical properties of the matrix viewable in the interstitial regions.

Figure 2:
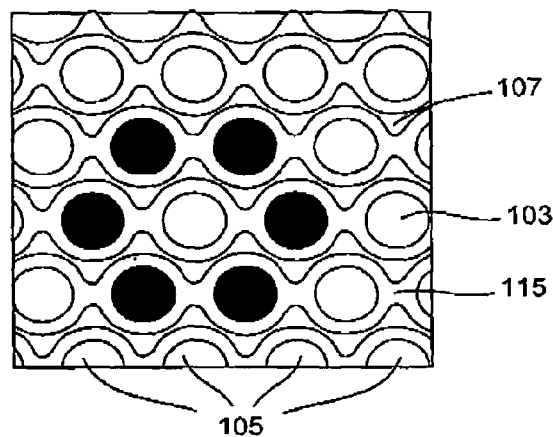
FIG. 2 shows a top view of a twisting element display illustrating hexagonally close-packed monolayer of spheres in accordance with one embodiment of the present invention.

Unfortunately, it is not geometrically possible to cover 100% of the display area with the spheres. It is, however, advantageous to minimize the interstitial area by using a monolayer of close-packed spheres. For example, a hexagonal close-pack, illustrated in FIG. 2 presenting a top view of the display, can afford up to $\pi/(2 \cdot 3^{1/2})$ or about 91% areal coverage by the spheres. Other packs, such as rectangular and rhomboidal arrays afford approximately 78% of areal coverage. All of the mentioned packs, as well as other arrangements of spheres on a plane known to those skilled in the art, can be used in the embodiments of present invention. Selected packs have been discussed in detail in U.S. Pat. No. 5,754,332 issued to Crowley et al., which is herein incorporated by reference in its entirety.

In one embodiment of the invention, the spheres are contained in an ordered array (e.g., square or hexagonal), in a containment matrix as close to each other as possible. The containment cells typically contain one sphere per cell, with the cell width being only slightly greater than the diameter of the sphere, so as to allow rotation of the sphere, but to minimize its translation. In order to minimize interstitial area, the walls of the containment matrix should be very thin, typically no thicker than about 20 percent of the sphere diameter (at the points where the spheres are closest together). In other embodiments, the wall thickness is no thicker than about 10 percent of the sphere diameter. In some embodiments, walls that define cells of the matrix may have a minimum width at regions separating adjacent cells of at most about 20% and in some cases at most about 35% of the size (diameter or width) of the cells. Preferably, walls with a thickness of at most about 13% or at most about 10% of the diameter or width of cells, are used. In those embodiments when walls are posts, thicker posts with widths of up to 35% of the size of the walls can be employed. In certain embodiments, the wall thickness is at most about 45 micrometers, more preferably at most about 10 micrometers, and even more preferably at most about 5 micrometers (each value measured at the points of minimal separation between the spheres). These close packing constraints may impose various structural requirements on the matrix. For example, they may require that the matrix walls have an average aspect ratio at positions of their greatest height and least width of at least about 5:1 (height to width), preferably at least about 8:1, for example about 10:1. In accordance with embodiments of this invention, an area projected by the cells onto the front plane can be at least about 65%, preferably at least about 75% or at least 85% of the total front plane viewable area. These values are only slightly smaller than the theoretically possible values for rhomboidal and hexagonal packs.

While it is advantageous to minimize the interstitial area between the adjacent rotating elements, as achieved by a matrix with a hexagonal close pack arrangement of the cells, it is often difficult to manufacture matrices with very high aspect ratio walls (as often required for hexagonal close packs). Further, high aspect ratio walls can be unstable and can be more easily broken during display assembly or during the end use of the display compared to lower aspect ratio walls. In some embodiments, lower aspect ratio walls, e.g., walls with an aspect ratio of 5:1 and lower are used. In some of these embodiments, the interstitial area is minimized by reducing or eliminating some of the wall structure between the spheres. In some embodiments, the cells are defined by "posts", arranged to provide a required close pack (e.g., a square or a hexagonal pack) for the incoming rotating elements. For the purposes of this application, the matrix walls include a variety of supporting and arranging features within the matrix, including solid walls, walls partially patterned with channels, posts, tapered posts, etc. It is noted, that it was unexpectedly discovered that contact between adjacent rotating elements does not substantially affect the performance characteristics of the rotating element displays. Therefore, in some embodiments, the walls can be reduced to the posts, which can function as supporting and arranging elements in the matrix. In one embodiment, it is preferred to use a square close pack of the matrix cells, wherein the cells are defined primarily or exclusively by posts with relatively low aspect ratios (e.g., 5:1 and lower). In other embodiments, particularly in a matrix with a hexagonal close pack, high aspect ratio walls (e.g., greater than 5:1) may be used. The choice of a packing arrangement, wall structure, and wall aspect ratio may depend on a variety of manufacturing considerations. For example, robustness of particular matrix material and its suitability for a hot embossing method, may be considered. Further, requirements for the display contrast and brightness should also be taken into account, when a particular matrix configuration is chosen.

In addition to the particular shape of the matrix, some aspects of the present invention focus on optical properties of the matrix. In order to maximize the contrast and brightness of the display, the reflectance of the interstitial area should be relatively high. This can be achieved, if the containment matrix itself (or at least the portion of the matrix displayed in the interstitial area between the elements) has high reflectance, preferably comparable to the lightest color of the elements. In certain embodiments, the viewable portions of the matrix have a diffuse reflectance of at least about 35%, preferably at least about 50% and more preferably at least about 70%. Further, the color of the viewable portions of the matrix should be the same or similar to that of the lightest color of the elements. For example, the matrix can be white or light-yellow, light blue, light pink, etc., depending on the "light" color of the rotatable elements.

In particular embodiments, a matrix having any one or more of the properties listed above (e.g., light colored interstitial regions) can be used in conjunction with displays that employ translationally moving particles. For example, particles, such as those used in the E-Ink or Sipix electronic paper technologies can be confined within the cells of a matrix as described above. In some embodiments, electrically and optically distinct particles of two colors (e.g., black and white) similar to those used in E-Ink technology, or particles of one color (e.g., white) suspended in a liquid of a different color from the color of the particles, similar to those used in Sipix technology, may be employed in conjunction with the matrix described herein. In one such embodiment, one or more particles having one color are suspended in a fluid having a color different from the color of the particles. For example, white titanium dioxide particles may be suspended in a black fluid. The particles are charged so as to translationally move towards one of the electrodes when a potential is applied to the electrodes of the display. Depending on the applied potentials, the particles may move either to or from the viewable area of the display. The particles, which are typically confined within transparent capsules are divided into an addressable array by a matrix, so that each of the matrix cells would contain one or more capsules, wherein each capsule contains a plurality of particles suspended in a fluid. Alternatively, each matrix cell may contain a plurality of unencapsulated particles. The electrodes address the cells of the matrix, so that, for example, one matrix cell may correspond to one pixel of the display. The pixel appears white to the viewer when white particles move towards the viewable area of the display and it appears dark when the particles move away from the viewable area. These types of displays are known as electrophoretic displays since they involve translational movement of charged particles in an electric field. This technology is described in detail in U.S. Pat. Nos. 5,930,026, 6,672,921, 6,067,185, 6,987,603, 6,839,158, 6,727881, and 6,795,229 which are incorporated herein by reference in their entirety and for all purposes.

Typically, in this embodiment, the matrix walls, when projected onto the viewable area of the display occupy about 5-7% of visible area when rectangular matrix cells are used. In certain embodiments, the structure of the matrix provided for this embodiment may differ in some regards from the matrix structure provided for rotating elements, since the particles used in this embodiment are typically much smaller than rotating elements, and one matrix cell may contain a large number of particles (either free or contained within microcapsules). Therefore, structurally, the matrix cells need not conform to shapes of individual particles. For example, rectangular instead of cylindrical cells may be used. Further it may be important to localize particles within individual cells and to prevent their mixing during the use of the display. Therefore, the cells of the matrix need not be in communication with each other, if such communication would allow particle mixing. For example, cells may be completely isolated from each other, or may have pores or channels that would not be wide enough for the particles (or capsules) to cross from one cell to another.

In particular embodiments, it may be important to maximize reflectance of the display by maximizing the reflectance of the matrix. In the existing E-Ink and Sipix technologies the matrix was typically made of a transparent material, rather than of a material having high reflectance (e.g. light or white) at least in its viewable areas. In order to maximize brightness and contrast of the display, use of a matrix having high reflectance in the viewable interstitial area in an electrophoretic display (such as E-Ink or Sipix electronic paper display) is desirable.

While it is advantageous to use a light colored matrix in some embodiments, in other embodiments it may not be crucial. In general, the matrix can have a wide array of optical properties, and may have various degrees of translucency and reflectance. For example, in some embodiments a transparent matrix may be used.

Further, for some applications, viewable interstitial regions of the matrix may have a color that is close or identical to one of the colors of the optical element of the electro-optic display regardless whether this color is light or dark. For example, a dark (or black) matrix may be used in combination with black and white bichromal spheres in certain applications, such as when light images on dark background need to be displayed. This also applies for the use of the matrix in conjunction with translationally moving electrophoretic particles. For example, viewable portions of the matrix may be the same color as the translationally moving particles, or the color of the liquid in which the particles are moving.

The matrix, in addition to its containment and light-reflection functions, also allows the cells, in some embodiments, to be in fluid communication with each other by providing one or several channels connecting the cells. Any number of individual cells can be connected by these channels, e.g., rows of cells can be connected by parallel channels or the matrix can contain both parallel and perpendicular channels, such that rows and columns of cells are in fluid communication with one another. The fluid communication between the cells serves various purposes. First, it allows the display structure to be filled with fluid through the channels in the matrix during the manufacturing process. This can be accomplished, after the device has already been partially fabricated, e.g., when the spheres have been placed into the cells and the front electrode layer has been sealed with the matrix. Such fabrication method compares favorably with other fluid-filling methods, since the channels allow the fluid to be easily aspirated into evacuated front plane structure in the final stages of front plane manufacturing, e.g., through side openings of the partially fabricated device. Secondly, fluid communication between the cells allows the dilution of light-absorbing impurities that may leach from the matrix into certain cells. Such impurities could lead to failure of individual pixels if the cells were isolated. Further, if optical properties of the fluid deteriorate over time, the channels would allow the fluid to be removed and the display to be refilled by fresh fluid, if necessary.

While fluid communication between the cells can also be achieved by employing a fluid-filled gap between the matrix and the front electrode layer, the channel design affords a thinner display and minimizes translational movement of the spheres within the cell, and hence, minimizes the driving voltage. The channel design also results in a more robust structure of the display, since the top part of the matrix is attached to the front electrode layer and ensures that the front layer is equidistant from the backplane and the sphere monolayer at any point. In the case of the gap design, the matrix is not attached to the front electrode layer, and the columnar pressure of the fluid can lead to bowing out of the front plane, possibly causing image distortion and decreased reliability of the device. Nevertheless, it should be understood that certain embodiments of the invention allow for a limited gap between the front plane and the upper surface of the matrix. Still other embodiments may not require a channel or a gap at all. For example, in some embodiments cells containing rotating elements may not be in fluid communication with each other (isolated).

In some embodiments, it may be advantageous not to allow all of the cells in a matrix to be in fluid communication, but to divide the matrix into several regions, such that all of the cells within the same region are in fluid communication, while the cells from the adjacent regions are separated by a solid wall that does not allow for fluid communication between the cells of adjacent regions. For example, a solid wall can divide the communicating cells every 2-100 (e.g., 5-50) rows of cells, thereby creating non-communicating regions of the matrix. The advantage of this design is that a failure of a single matrix cell, due to, e.g., leaching of a colored component into the dielectric fluid, will not lead to the failure of the entire display, but would be confined only to the region in which the cells are in fluid communication, without affecting adjacent regions which are separated from the failing region by a solid wall. For example, a matrix containing regions having a plurality of posts, wherein the posts define the arrangement of individual cells, and wherein the regions are separated from one another by solid walls, may be employed.

While in some embodiments the provided displays primarily make use of the rotational movement of the rotating elements without using their translational movement, other embodiments may make use of translational movement of the rotating elements, in order to further increase the contrast of the display. For example, the height of individual cells can be increased, such that a rotating element could translationally move between the electrodes towards and away from the viewer, in addition to its rotational movement. In these embodiments the height of the cell can be at least 1.1 (e.g., 1.5) times greater than the largest dimension of the rotating element. While this embodiment may require a greater driving voltage for the display, the contrast of such display is often improved compared to a purely rotational display. In addition, the higher walls are preferred during the display assembly process, because they provide an additional space to be occupied by an adhesive during the operation of attachment of the front electrode layer to the matrix.

While a containment matrix, in general, is useful for providing an ordered array of spheres, in selected embodiments it may be absent from the design or may be substituted by alternative structures.

In certain embodiments, at least some of the rotating elements are arranged in a "monolayer." A monolayer of rotating elements will reside between the back and front electrodes of the display and will present most of the viewable elements. Generally, the monolayer will be provided as a surface layer of the display and will have a thickness that is not substantially greater than the dimensions of a single rotating element (or at least a cell used to constrain it). The monolayer will typically conform, at least generally, to the shape of the display. If the display is flat or substantially flat, then the monolayer typically will be substantially flat. If the display has some curvature, the monolayer will typically have a corresponding curvature. Commonly, the monolayer will contain closely packed rotating elements; these elements should not necessarily form a defined geometrical structure on a surface. For example, a hexagonally packed layer and a randomly packed layer of elements are both within the scope of present invention. In some embodiments, the monolayer may also include elements of smaller dimensions than those in the primary layer, located in the front of or behind the primary layer of elements. In yet other embodiments, the display device may contain additional rotating elements that may supplement the monolayer.

While the element monolayer may be substantially planar (or otherwise conform to the shape of the display), it should be understood that the rotating element display may be flexible or even foldable in some embodiments, and therefore may have significant variation in conformation.

In yet other embodiments, one or several layers of rotating elements can be used in conjunction with a matrix which provides cells designed to host a plurality of elements. For example the matrix can have cells arranged in a hexagonal or square close pack, wherein each cell may host a monolayer or several layers (e.g., between about 2-5 layers) of optically anisotropic elements. For example, between about 10-100 elements can reside in a single cell. Advantageously, when several layers of elements are used, the contrast of the display can be improved because the elements from the underlying layers, which rotate in concert with the elements of the first viewable layer fill in the interstitial regions of the first viewable layer with the correct color. In some embodiments, it is advantageous to shape the walls of the matrix containing the plurality of the elements, such that the walls mold to the shape of the plurality of elements residing at the wall. For example, for spherical elements, a matrix with scalloped walls can be used.

Rotating Elements

Elements suitable for use in the twisting element or rotating element display may have a variety of shapes and structures. Rotatable elements suitable for use with this invention may be shaped as spheres, cylinders, ellipses, ovals, football-shaped elements, and the like. Structural aspects of these elements will be illustrated with the reference to spheres, but it should be understood that the same structural considerations can be applied to other shapes.

A sphere used in this invention can have a hollow or solid core, and be coated with one or more coatings, so that the coating or coatings provide optical and electrical anisotropy to the sphere. A variety of coating methods known to those of skill in the art can be used. In some embodiments hemispherically coated elements can be manufactured by the transfer coating methods described in commonly owned application Ser. No. 60/876,767, titled "Hemispherical Coating Method for Micro-elements", naming Lipovetskaya et al. as inventors filed Dec. 22, 2006, which is herein incorporated by reference in its entirety and for all purposes.

In one example, the core sphere can be hemispherically coated (or approximately hemispherically coated) with two coatings having different optical and electrical properties. For instance, a white coating providing negative charge and a black coating providing positive charge can be employed. The core sphere itself may be neutral or charged. In this example (employing two different coatings on a core sphere), optical properties of the core sphere are typically not important, since its surface is not presented to the viewer.

In those cases, when the core sphere itself has suitable optical properties (e.g., highly diffuse or specular reflectance), it can be hemispherically coated with a coating differing from the core sphere both optically and electrically. For example, a white essentially neutral sphere can be hemispherically coated by black pigment carrying negative charge.

In an alternative embodiment, no core sphere is employed, and instead two hemispheres with different properties can be fused together or otherwise combined to form an optically and electrically anisotropic sphere. For instance, solid or hollow black and white hemispheres carrying opposite charges can be fused.

Figure 3A:
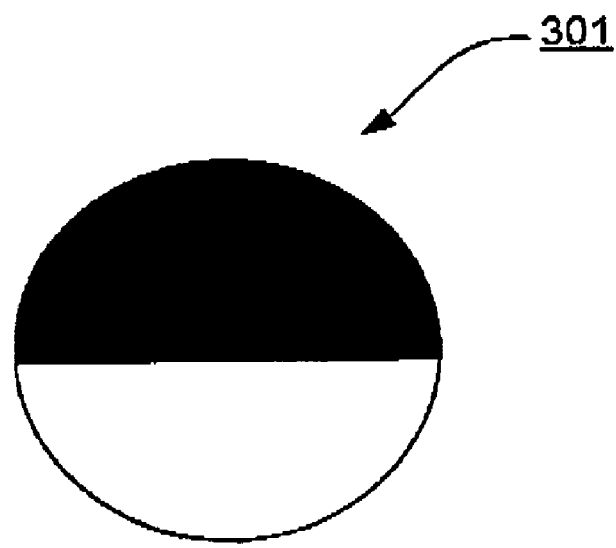
FIG. 3A shows a side view of a bichromal sphere suitable for a twisting element display.
Figure 3B:
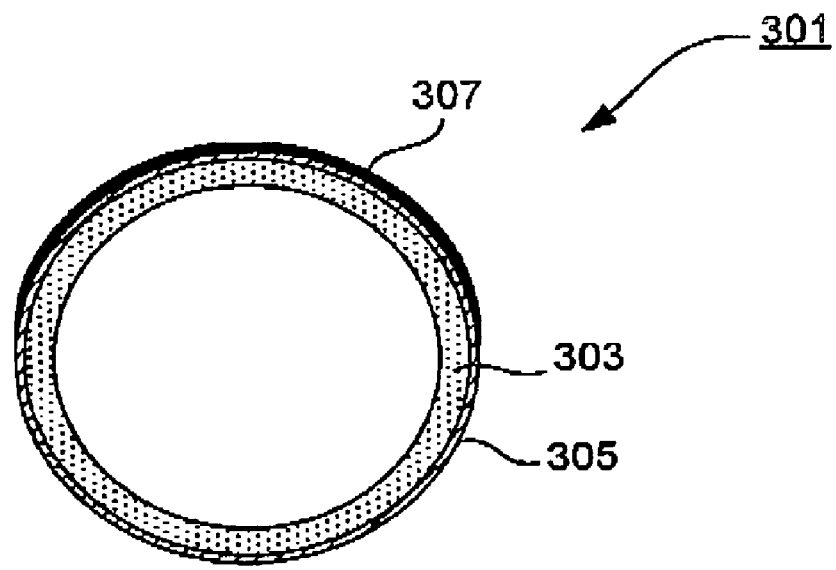
FIG. 3B shows a cross-sectional view of the sphere presented in FIG. 3A.

Examples of elements that can be used in the display structure are illustrated in FIGS. 3A and 3B. FIG. 3A shows a side view of a bichromal sphere 301, and FIG. 3B shows a sectional view of the same sphere. In the depicted example, a hollow core sphere 303 is completely coated with an opaque white coating 305, and with a black hemispherical coating 307 on top of the white coating. While black and white colors of the spheres provide the highest contrast images, other color combinations can be used as well. Especially advantageous combinations include those in which one side of the sphere is substantially darker than the other, e.g., white and red, yellow and blue, yellow and black, or any other light and dark combination. Light and dark colors are relative properties. However, in certain embodiments presented herein, light colors are defined as those having at least about 50%, preferably above 80% reflectance. In certain embodiments the black or darker color has a reflectance of less than about 10%, more preferably less than about 5%, and even more preferably less than about 2%. In other embodiments, the colors of rotating elements, need not necessarily be light and dark, but may be complementary to each other so that a desired visual effect is created. For example, black and orange, black and red, white and blue or other color combinations capable of creating a well viewable image, may be used, regardless of relative lightness or darkness of these colors.

Note that it can be difficult to measure the reflectance values of small curved objects such as the rotating elements employed in this invention. To address this challenge, reflectance can be measured from a large set of rotating elements in a close packed arrangement in a monolayer (e.g., a hexagonal close pack arrangement) attached to adherent tape. Obviously, the reflectance value is function of the color of the tape background. The above values of reflectance may be measured using white tape (i.e., tape providing a white background for the reflectance measurements). A common technique may involve measuring spectral response of a sample using an industry standard spectrometer, such as a Gretag Mcbeth Spectroscan.

While an advantageous property of the present invention resides in the ability to provide high-contrast images, it can also be used in applications in which high contrast is not needed. For example, green/tan color combination can be used to produce an electronic material with a camouflage-like appearance for military applications, and the like.

Aside from possessing different colors, the spheres can possess other types of optical anisotropy. For example, hemispheres with different levels of diffuse and specular reflectance can be used. In some embodiments one hemisphere has a high specular reflectance, while the other is opaque and dark-colored. For example, a specularly reflective glass core sphere can be hemispherically coated with a dark pigment, without application of a white layer.

In other examples, the rotating elements may have retroreflective or light-emitting portions. Further, rotating elements having luminescent (e.g. fluorescent or phosphorescent) portions may also be used. These, for example, may be prepared by applying hemispherical coating doped with luminescent material to the core sphere.

The spheres should be relatively small in order to provide good display resolution. Appropriate sizes include spheres with diameter ranges of about 25-150 µm, preferably 35-100 µm, for example about 50 µm. Obviously there may be some variance in the sizes of the spheres in a given display. This can be controlled by appropriate sizing techniques such as sieving. In certain embodiments, the matrix has a cell size of 50 µm, while the spheres have a nominal diameter of about 47 µm with a usable range between 45 µm and 49 µm, with a standard deviation of about 1 µm. For optimal optical performance, the sphericity of rotating spheres should be high (e.g., at least about 95%), and the size distribution in the population of spheres should be 10, small. For example a population of coated spheres that range from about 45 to 49 µm in diameter can be used in an individual display. The hemispherical coating layer can be about 1-2 µm thick, and should not significantly distort sphericity of the elements. In certain embodiments, the surface roughness of this coating does not exceed about 0.5 µm. Alternate sizing combinations can also be implemented. For example a matrix with a cell size of 58 µm could utilize a spheres with a nominal size of 55 µm, and a range of 53 to 57 µm.

It should be realized, that much larger elements may be used in certain embodiments. For example, for billboard signs that are typically viewable from the distance of several hundred feet, rotating elements having a diameter of 1-2 inches may be appropriate. In general, elements of any size, that would produce a good display resolution for a particular application of the display, will be suitable The materials used for the core sphere and for the coatings should preferably have a melting point or glass transition point of higher than 100° C., in order to withstand high-temperature operations during the manufacturing process and exposure to high temperature during end use. The coating materials should also be compatible with the fluid in which the spheres will be suspended for rotation, e.g., they should not dissolve or swell in this fluid. Further, it may be desirable to employ elements having a density that is similar to that of the dielectric fluid. In certain embodiments, the spheres, or at least the core sphere is made from a material such as glass, ceramic, or polymer. The spheres, although they can be made from intrinsically brittle materials, should have good crushability characteristics. For example, they may be able to withstand compressing liquid pressure in the range of 350-3000 psi, as used in the standard industry crushability test.

Rotation of the spheres by 180 degrees (or by a greater or lesser amount as necessary to effect a display transition) should occur within a defined window of electric field. The transition should occur easily at fields generated by actuation of backplane control circuits. Typically, a field of about 0.2 V per micrometer is generated (e.g., a potential differential of about 15-20 volts is generated over 75-100 micrometers (a typical back and front electrode separation distance of this invention) but should not occur at significantly lower voltages such as those encountered to charge lines in the backplane. Thus, for example, display transitions may be designed to occur at fields attained at 15-20 volts over 75 micrometers.

In a specific example, erasing the display image to all white color involves applying 20 V to all of the back plane electrodes with reference to ITO electrode layer. Erasing the display to all black color may involve flipping the polarity, so that ITO electrode layer is at 20 V with reference to all back plane electrodes. Alternatively, erasing the display image to all black color may involve applying −20 V to all of the back plane electrodes with respect to the ITO layer. T In this example, the total voltage drop in any pixel is never greater than 20V, but the bus carrying voltage must be able to handle the range of −20 V to +20 V. The +/−20 V window is a suitable potential for organic semiconductor/conductor backplanes. When using other types of backplanes, such as inorganic TFTs, for example, higher voltages (e.g., +/−40 V) may be employed. For segmented circuit board back planes, one could use even higher voltages. It is expected that such voltages will generate a torque force sufficient to rotate the sphere. However, design considerations require that the spheres have a mass and surface charge distribution appropriate to accomplish this. It is, therefore, important to provide spheres made from materials with appropriate densities, so that they could be rotated in the designed voltage range. Depending upon the dielectric fluid employed and other design criteria, the spheres may have a density of between about 0.4 and 6 g/cm$^3$, preferably between about 0.4 and 1.3 g/cm$^3$. In certain embodiments, it may be advantageous to use hollow spheres, which may be made of glass, ceramic, or high-temperature resistant polymeric materials. Such spheres may have densities ranging from 0.03-2.5 g/cm$^3$. Solid glass, ceramic, or polymeric spheres with densities ranging from about 1 to 6 g/cm$^3$ can also be used.

The core spheres with such characteristics can be obtained from various commercial suppliers. In some cases, these spheres are marketed for surface processing applications. It may be necessary to sieve commercially obtained spheres in order to ensure a tight size distribution suitable for electrophoretic displays. For example, hollow and solid glass spheres can be obtained from 3M Corporation, Maplewood, Minn. (Scotchlite glass bubbles, K-series (e.g., K1, K15, K25, K32, or K46)). In addition, hollow glass spheres can be obtained from Potters Industries, Berwyn, Pa. Ceramic spheres can be obtained from Saint-Gobain Coating Solutions, Northampton, Mass., and plastic spheres can be obtained from Asia Pacific Microspheres SDN BHD, Selangor Darul Ehsan, Malaysia & Grinding Media Depot, Wyncote, Pa.

Figure 4:
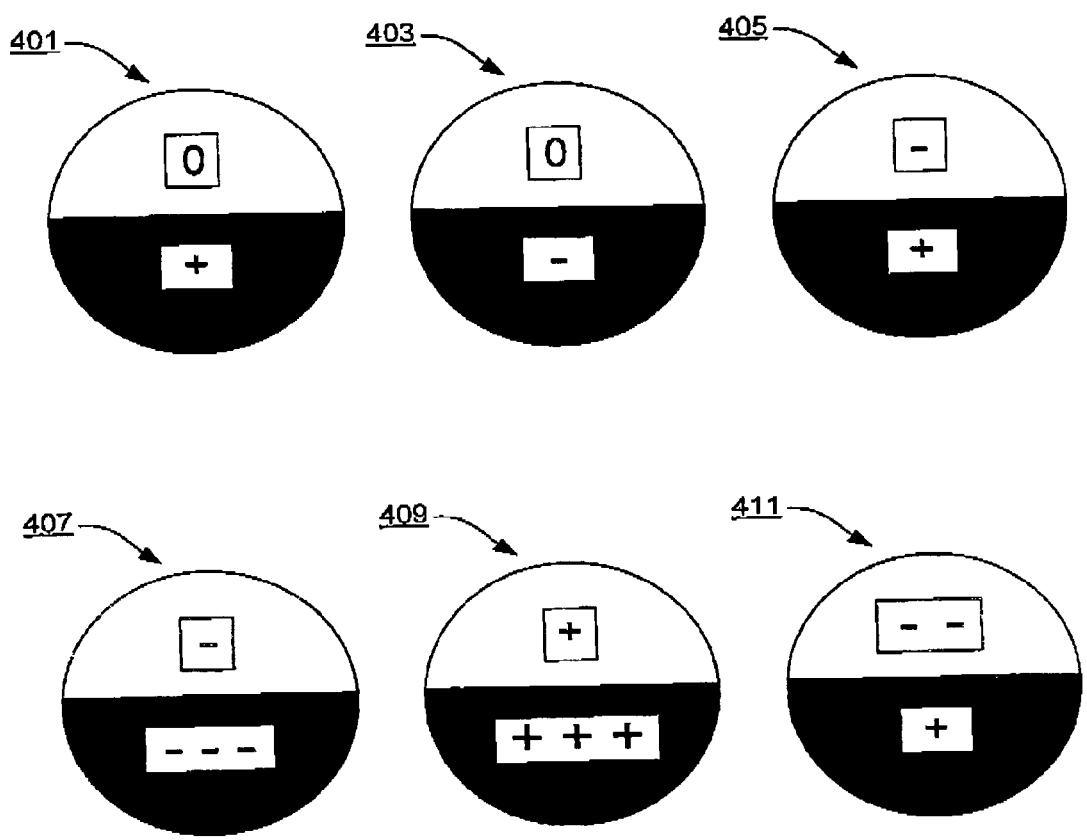
FIG. 4 presents selected examples of charge distributions suitable for providing electrical anisotropy to the spheres.

The spheres should be electrically anisotropic, in order to be sensitive to the electric field. Electric anisotropy does not necessarily imply that the two hemispheres are oppositely charged. It is sufficient, that there is some nonuniformity in the charge distribution about the surface of the sphere and that this nonuniformity correlates with optical anisotropy. A variety of different charge distributions are possible. Some of the examples are shown in FIG. 4. As illustrated by spheres 401 and 403, one hemisphere can be neutral, while the other can be positively or negatively charged. In sphere 405, the hemispheres have opposite charges of equal magnitude. It is also possible to have oppositely charged hemispheres with one charge being greater than the other as illustrated by sphere 411. In sphere 407 both hemispheres are negatively charged and higher charge density exists on a black hemisphere. In another example, depicted by sphere 409 both hemispheres are positively charged, with higher charge density residing on a black hemisphere. In general, spheres having any nonuniformity in charge distribution about their surface, e.g. a dipole moment, can be used.

In one embodiment, significant quantity of charge is provided to the sphere via the coatings, particularly by the hemispherical coating, while the core sphere is neutral or possesses a small amount of charge. The hemispherical coating should preferably provide a permanent electric charge. The necessary charge may be provided, for example, by the pigment or the binder of the coating or by special charge enhancing additives. Examples of these additives include quaternary ammonium compounds, organic sulfates and sulfonates and other compounds known to those of skill in the art, such as those listed in U.S. Pat. No. 6,379,856, which is incorporated herein by reference in its entirety. The necessary charge may also be provided by special processing techniques of coating preparation and application. These techniques impart charge by, e.g., applying friction to the coating material as it is dispensed.

In one embodiment, the coating is relatively thin in comparison to the dimensions of the sphere (e.g., about 1-2 µm thickness). The coating should provide optical and surface properties as presented above (e.g., reflectivity, opacity, color, and roughness). In certain embodiments, the coating is made from binder and a pigment. In some embodiments, a solvent may be added for manufacturing. In some embodiments, a special charge-imparting agent may be added.

The spheres are electrically anisotropic when immersed into the fluid for rotation. While it is advantageous that they possess a permanent electrical anisotropy, in some embodiments this anisotropy may be induced or enhanced when they are immersed into the fluid, either by the fluid itself or by other means.

The fluid should have appropriate characteristics that will allow sufficient rotation (e.g., complete 180 degree) of the sphere in the preferred driving potential range. Dielectric fluids, essentially non-conductive transparent fluids, such as silicon oils, mineral oils and isoparaffins are suitable. The fluid should preferably have a conductivity of less than 1000 femtomho/cm (femtosiemens/cm), preferably between about 20 and 200 femtomho/cm. In certain embodiments, the fluid will have a low dielectric constant (e.g., less than about 2.5 (preferably less than about 2)) and a viscosity of between about 0.5 and 5 centistoke. These characteristics are selected so that a threshold voltage, response time, and operating voltage window of the device are optimized. Examples of suitable dielectric fluids include silicone fluids, such DC200 available from Dow Corning of Midland, Mich., isoparaffins, such as ISOPAR, available from Exxon Mobile of Irving, Tex., and fluorinated fluids manufactured by 3M.

Throughout this document, hemispherical optical and electrical properties are discussed. This does not imply that the optical or electrical properties are limited to exactly hemispherical dimensions. In certain embodiments, the elements may be designed to have one optical material occupy less than a full hemisphere of the element's surface and another optical material occupy more than a full hemisphere. In some embodiments, it may be advantageous to have more than two optically different portions within one sphere. For example a sphere having two less than hemispherical coatings (e.g. opaque black and white) with a transparent strip separating them may be useful for some applications. The strip will provide a clear transmissive effect that is very different from normal black and white appearance. Examples of elements of this type are described in U.S. Pat. No. 5,892,497, which is herein incorporated by reference in its entirety.

Further, even if the desired result is hemispherical, it should be noted that suitable displays may be produced, in certain embodiments, using populations of rotating elements that have significant variance in the geometric extent of the optical or electrical properties. For example, it may be suitable to use a population of rotating elements having optical coatings that vary on average by 10% or even 20% from a perfectly hemispherical covering. Other applications may not tolerate such wide variance.

Matrix Design and Fabrication

As indicated, displays of this invention may employ a matrix or other structure for confining rotating elements. The structure of a typical matrix allows containment of equally spaced rotating elements in an ordered array of cells or cavities. In one embodiment, the cells are arranged in a hexagonal geometry (e.g., a hexagonal close pack pattern) with minimal distance between the centers of adjacent cells. Other embodiments of the matrix structure, such as those providing square, rectangular or rhomboidal arrays for packing of the spheres, can be used. In general, the matrix can provide a containment structure of any desired geometry for the spheres as well as for the elements of other shapes (e.g., cylinders, football-shaped elements and the like). In one of the depicted embodiments, the cells are defined in part by serpentine walls offset from one another to allow a hexagonal packing arrangement. In other embodiments, other wall designs (e.g., straight or relatively uncurved shapes) or even pillars (posts) may be employed.

A number of exemplary matrix configurations will be described. The matrix configurations include but are not limited to configurations with and without channels; configurations with square, hexagonal, and rhomboidal close packs of cells, configurations with continuous walls, walls with channels formed therein, and posts; configurations where each cell is designed to host one or plurality of rotating elements, configurations where the matrix allows for purely rotational movement of the elements and configuration in which the matrix design allows for translational movement of rotating elements between the electrodes towards and away from the viewer. The matrix configurations are not limited to the described examples, and a variety of alternative matrix configurations can be used, as will be recognized by one of skill in the art.

Figure 5A:
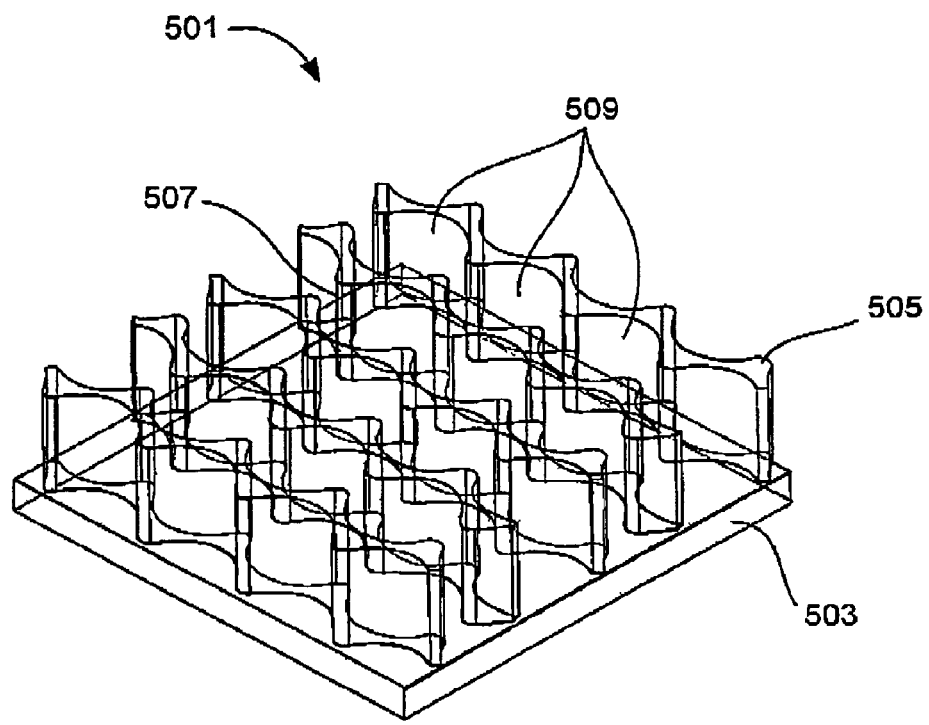
FIG. 5A shows an isometric view of a matrix structure illustrating a hexagonal close pack of matrix cells with parallel channels in accordance with one embodiment of the invention.
Figure 5B:
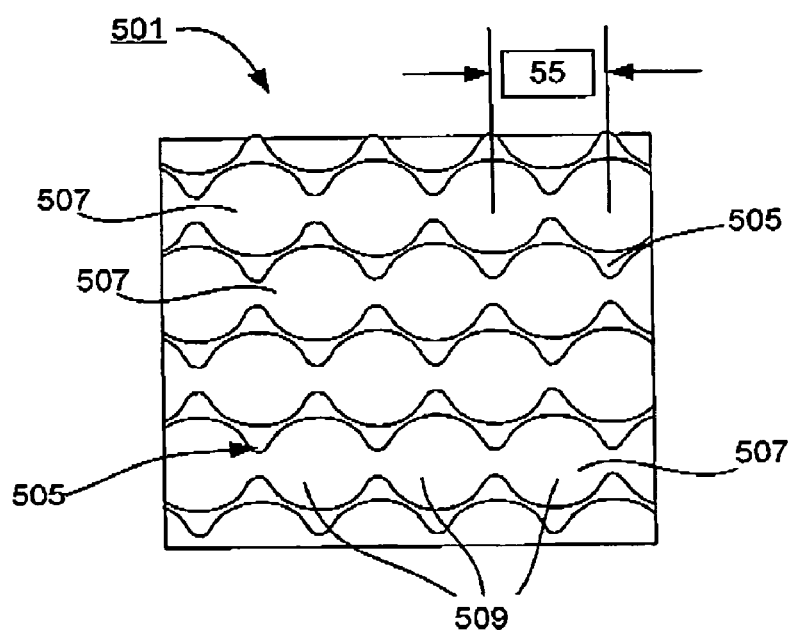
FIG. 5B shows a top view of the matrix structure presented in FIG. 5A.

A matrix configuration with an arrangement of cells in a hexagonal close pack and with a number of parallel channels extending through an entire height of the cell wall, is illustrated in FIGS. 5A-5B. FIG. 5A provides an isometric view of one example of a matrix 501 in accordance with this embodiment. A top view of this matrix is shown in FIG. 5B. The matrix 501 includes a matrix base 503 and matrix walls 505. A series of parallel channels, including a channel 507, run through the matrix walls, and provide fluid communication between the cells 509. In the depicted embodiment, the cell walls are arranged so that a hexagonal close-pack structure is provided for the spheres. The cells have an essentially cylindrical geometry, with a diameter of the cell being only slightly greater than the diameter of the sphere. The depth of the cells is defined by the height of cell walls and in this embodiment does not substantially exceed the diameter of the spheres. In alternative embodiments, higher walls may be employed, and the matrix design may allow for a translational movement of the spheres within the cells.

Generally, it is advantageous to closely match dimensions of the holding cell to the dimensions of the element that is disposed within it. The internal cell dimensions (typically height and width or height and diameter) should be selected preferably so that the element does not rotate until a certain threshold voltage is applied to the display electrodes. Together with the carefully selected viscosity of the dielectric fluid, the matched dimensions of the cell and the element are important factors for providing a desired voltage window and display bistability. Further, in those embodiments, where purely rotational movement is desired, the cell dimensions should be chosen to not allow substantial translation of the element within the cell. In certain embodiments, the cell dimensions should exceed the dimensions of the rotating elements by only about 1 to 10 µm, more preferably by about 1 to 5 µm. For example, for spheres with diameters ranging from about 45 to 49 µm, cells with a diameter of about 50-55 µm and a depth of about 50-55 µm may be employed.

By controlling the cell height to provide minimal separation between the back and front electrodes, one minimizes the driving voltage necessary for display operation. For a display employing spheres with a nominal diameter of approximately 49 µm, a separation between front and back electrodes of about 75 µm can be achieved with the base of the matrix having a thickness of about 25 µm, and the height of the cells of about 50-55 µm. Obviously, these dimensions can be scaled for other sphere sizes.

As indicated, it is often desirable to closely pack the rotating elements, leaving very little room between neighboring elements. To this end, the walls of the matrix may be made very thin, particularly at points where the elements come closest to one another. In certain embodiments, the minimum wall thickness is no greater than about 45 µm, e.g., no greater than about 5 µm. The center-to-center separation between the cells may be in the range of about 27-200 µm depending on the size of rotating element. For example, for spheres having a nominal diameter of about 49 µm, a center-to-center separation of about 53 to 60 µm (55 µm in a typical case) may be employed.

Of course, the walls of the matrix must be sufficiently high to provide separation from the front electrode and allow rotation of the elements. This means that the matrix may have relatively high aspect ratio walls. Walls with an aspect ratio of greater than 5:1 (height to width), preferably greater than 8:1, for example greater than 10:1 may be required. Fabrication techniques for producing such structures are described below. In the exemplary embodiment presented here, the aspect ratios correspond to a wall thickness of less than about 7 μm, e.g., less than about 5 μm at a wall height of 50-55 μm. For example, a 55 μm center-to-center separation between the closest spheres in the pack is achieved when the wall separating the adjacent cells has a thickness of less than about 5 μm, e.g. less than about 3 μm. These dimensions are applicable to an embodiment in which the diameter of the spheres ranges from about 45 to 49 μm. The matrix can be scaled in accordance with the size of the spheres in use, while maintaining close spacing between the spheres, as will be understood by those skilled in the art. For example, for spheres having a diameter of about 150 μm, walls that define cells of the matrix may have a minimum width at regions separating adjacent cells of at most about 45 μm.

It should be understood that the invention is not limited to embodiments in which the matrix walls provide the entire internal height of the cell (in the direction between the front and back electrodes). Some structures may employ front electrode structures or intermediate structures that provide at least some of the internal cell height. In one alternative embodiment, the matrix walls provide only a fraction of the total height required for separation and a structure associated with the front electrode provides a mating lattice providing the remainder of the needed separation height. Of course, the matrix and front electrode structures would have to be carefully aligned to provide the required cell structures.

Figure 6A:
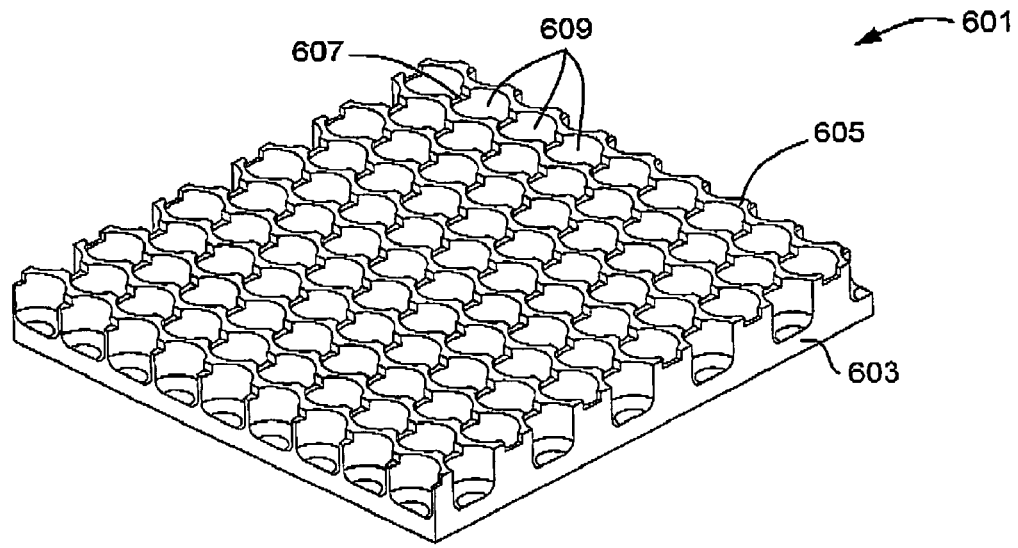
FIG. 6A shows an isometric view of a matrix structure illustrating a hexagonal close pack of matrix cells with parallel channels in accordance with another embodiment of the invention.
Figure 6B:
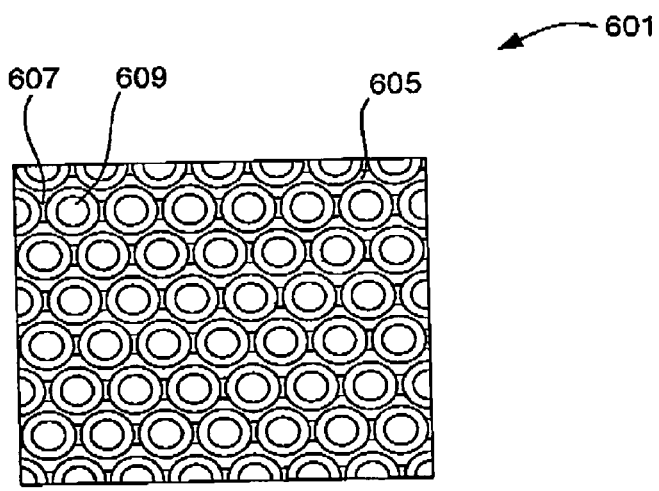
FIG. 6B shows a top view of the matrix structure presented in FIG. 6A.
Figure 6C:
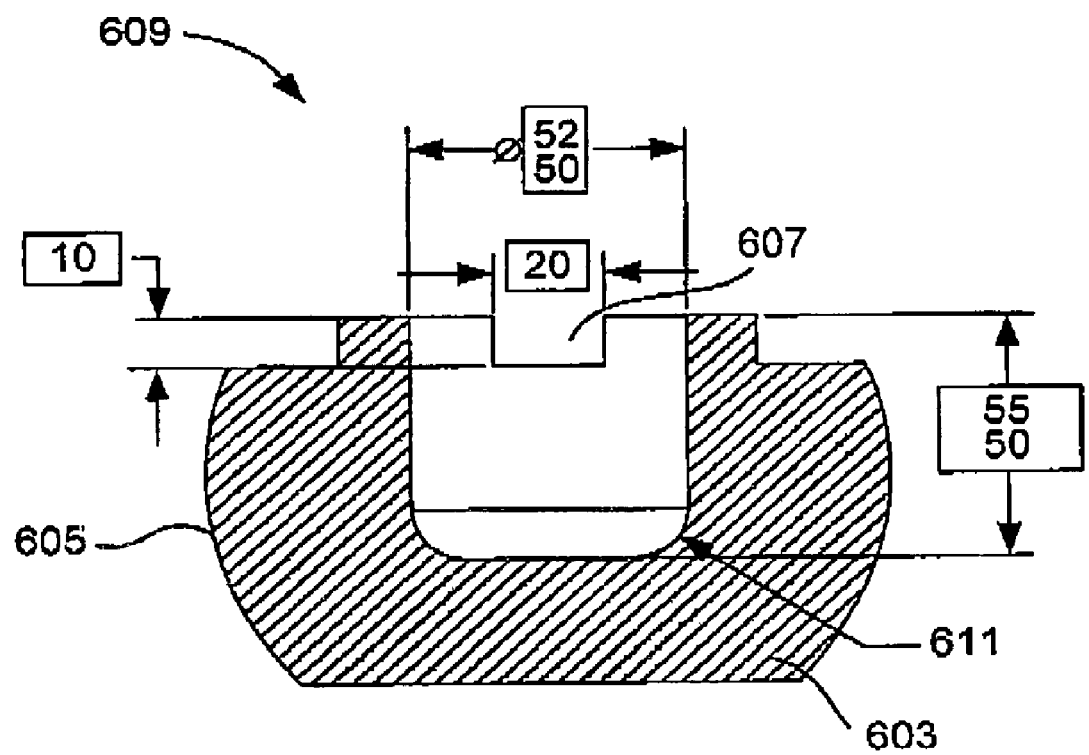
FIG. 6C shows a cross-sectional side view of an individual cell of the matrix presented in FIG. 6A.

As explained, some embodiments of the invention employ one or more intercell channels to provide fluid communication between certain cells. Generally, a channel or channel network running through the walls of the matrix can run though any number of cell walls and can connect any number of cells with each other. As shown in FIG. 5A, the channel 507 runs through two walls of each cell, and connects parallel lines of cells in a row-like fashion. Other embodiments employing more tortuous channel paths are possible. Other embodiments employing intersecting channel paths are also possible. The cell walls in regions through which the channel runs can be entirely or substantially absent, as in the embodiment illustrated by FIGS. 5A and 5B, or, they can be present to some extent as illustrated in a separate matrix embodiment presented in FIGS. 6A, 6B, and 6C. FIGS. 6A and 6B show an isometric view and a top view of a matrix structure in accordance with this embodiment, respectively. FIG. 6C shows a cross-sectional side view of an individual cell of the matrix. The elements of the matrix are numbered analogously to the elements of FIG. 5. As depicted, a channel 607 occupies the upper portion of the cell walls and has a cross-sectional area sufficient to allow free flow of fluid from cell to cell (e.g. an area of at least about 200 μm²). For example, this channel may have a depth of about 10 μm and a width of about 20 μm. In general, the channel may occupy a particular percentage of the cross-sectional area of the cell. For example, in some embodiments, it is preferable that the cross-sectional area of the channel is at least about 5% or at least about 8% of the cross-sectional area of the cell. Specifically, a 200 μm² channel occupies about 8% of the cross-sectional area of a 50×50 μm cell. For smaller cells, smaller channels will generally be used. For examples, channels with a cross-sectional area of at least about 30 μm² may be appropriate in some embodiments. The matrix of an embodiment shown in FIG. 6A-6D also has a slight narrowing 611 at the bottom portion of the cell (e.g., at the bottom 25 μm of the cell). This narrowing typically follows the contours of the sphere, therefore affording a better fit than a strictly cylindrical shape of the cavity. The diameter of the cell, in this embodiment, refers to the diameter, measured above this narrowing. The embodiment of FIGS. 6A through 6C provides a stronger matrix lattice in comparison to the embodiment of FIGS. 5A and 5B, at the expense of more limited intercell fluid communication.

While theoretically the hexagonal close pack provides the highest possible fill factor, it also demands the highest aspect ratio for its walls. While for some matrix sizes and for some matrix materials, matrices having walls with aspect ratios of greater than 5:1 can be easily manufactured, for particularly small-scale matrices made of fragile materials, such high aspect ratio walls may be difficult to manufacture. Further, high aspect ratio walls may be unstable during display assembly and end use of the display.

Figure 7A:
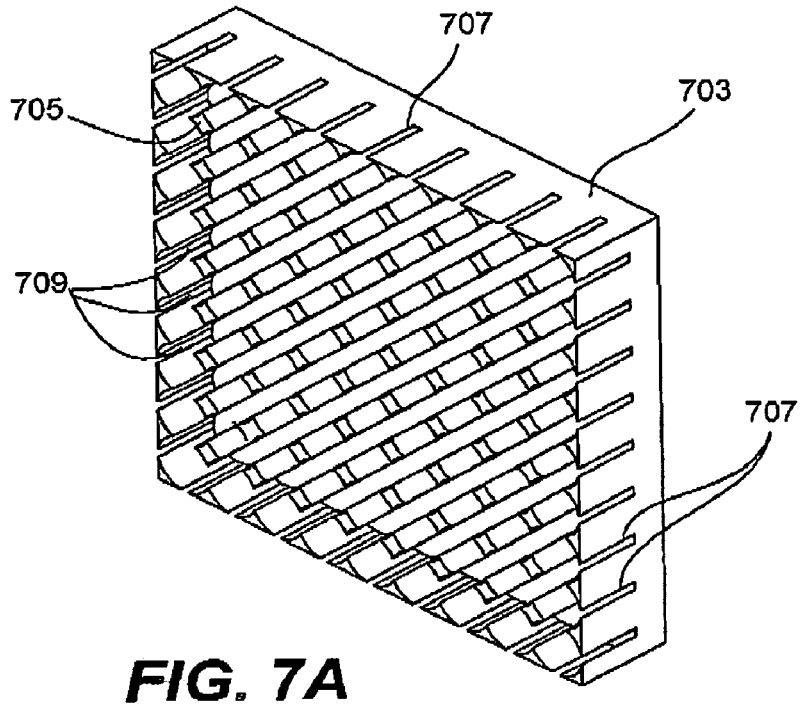
FIG. 7A shows an isometric view of a matrix structure illustrating a square close pack of matrix cells with parallel and perpendicular channels in accordance with an embodiment of the invention.
Figure 7B:
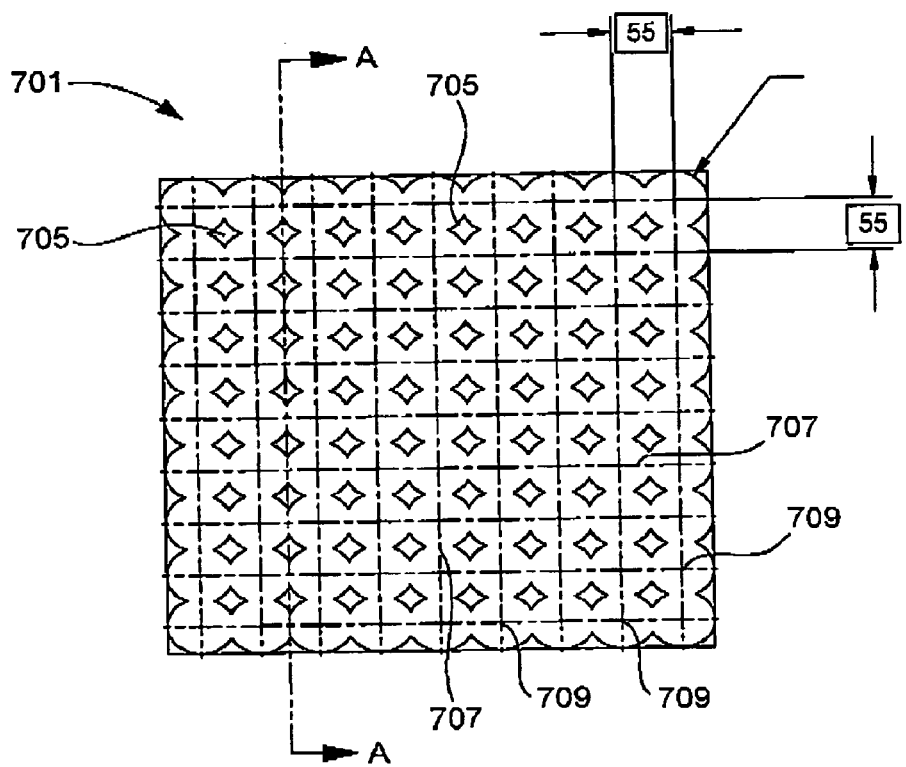
FIG. 7B shows a top view of the matrix structure presented in FIG. 7A.
Figure 7C:
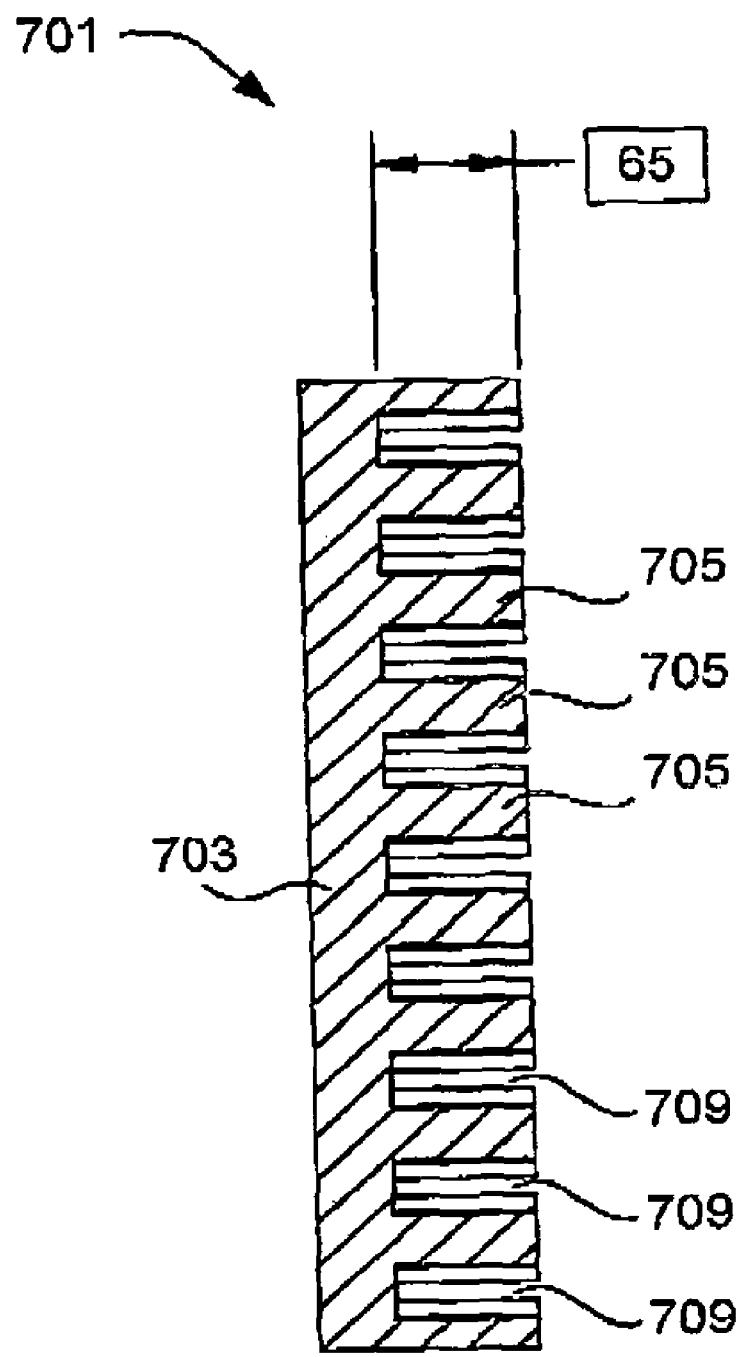
FIG. 7C shows a cross-sectional side view of the matrix presented in FIG. 7A.

In an example illustrated by FIGS. 7A-7C, a matrix with a square close pack arrangement of cells is provided. Advantageously, such matrix can employ relatively low aspect ratio posts serving as its cell walls and defining the arrangement of spheres in the matrix. For example, the aspect ratio of such posts can be 5:1 and lower. FIG. 7A provides an isometric view of a matrix structure in accordance with this embodiment. FIG. 7B provides a top view and FIG. 7C provides a cross-sectional view of this structure respectively. The numbering of matrix elements is analogous to the matrix structure shown in FIGS. 5A-B. It can be seen that in the embodiment presented in FIGS. 7A-7C the matrix includes a number of posts 705 defining the square close pack arrangement of the cells. Each cell 709 is in fluid communication with all of its adjacent cells through intersecting channels 707. Example dimensions for a matrix designed to host spheres having a diameter of about 50 μm are the following: cell spacing of about 55 μm, and cell wall height of about 65 μm. In one embodiment, the walls (e.g., posts) that define cells of the matrix have a minimum width at regions separating adjacent cells of at most about 35% of the diameter or width of the cells. For example, posts having widths of about 20 μm can reside between 58 μm-wide cells.

It is noted that spheres when residing in such matrix can contact one another through the channels, and such contact does not substantially affect the performance of the display. The matrix configuration presented in FIGS. 7A-7C has several advantages. First, the presence of posts rather than extending walls minimizes the interstitial area of the display and minimizes interactions between the spheres and the walls. Further, the square pack design according to this embodiment allows a high sphere fill factor. For example, a fill factor of at least about 65% has been practically achieved for spheres ranging in 45-53 Mm in diameter with a cell spacing of 55 μm and a cell clearance of 58 μm. Further, such matrix can include low aspect ratio posts, which makes such matrix more manufacturable in comparison with matrix configurations which require high aspect ratio features.

Figure 8A:
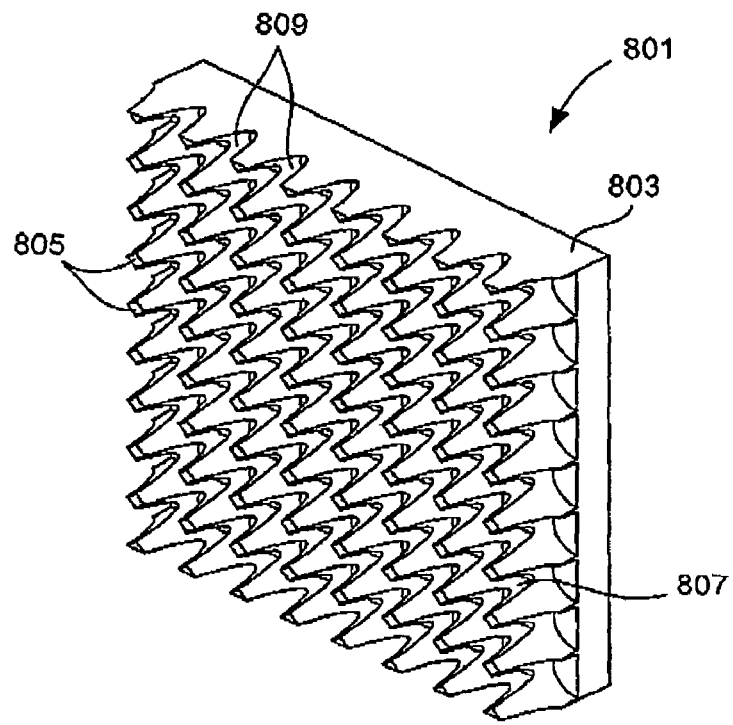
FIG. 8A shows an isometric view of a matrix structure illustrating a square close pack of matrix cells with parallel and perpendicular channels in accordance with an embodiment of the invention.
Figure 8B:
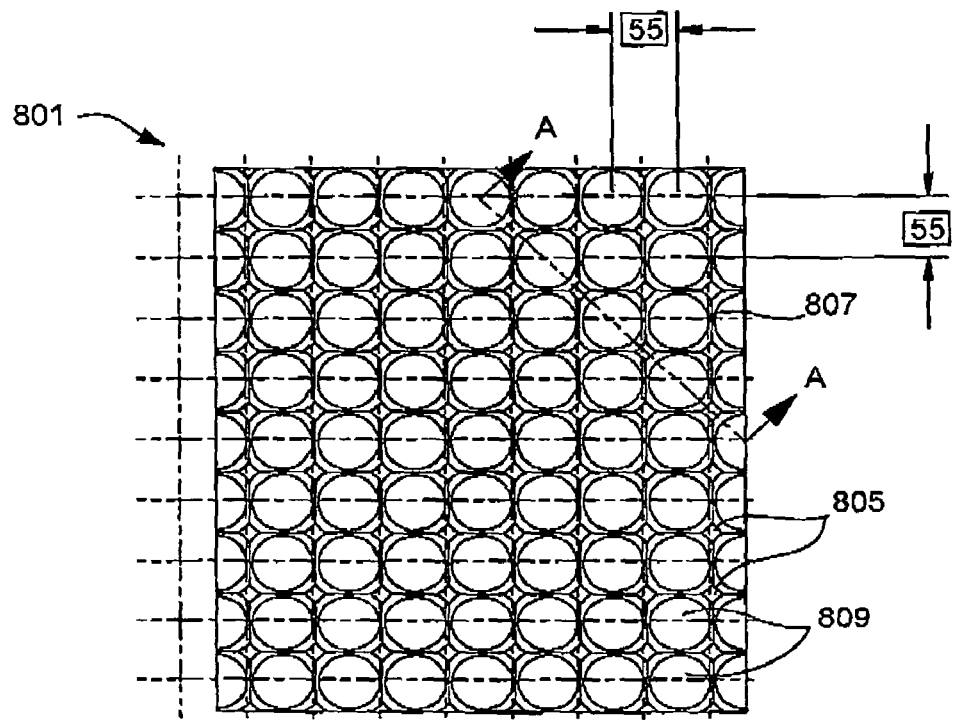
FIG. 8B shows a top view of the matrix structure presented in FIG. 8A.
Figure 8C:
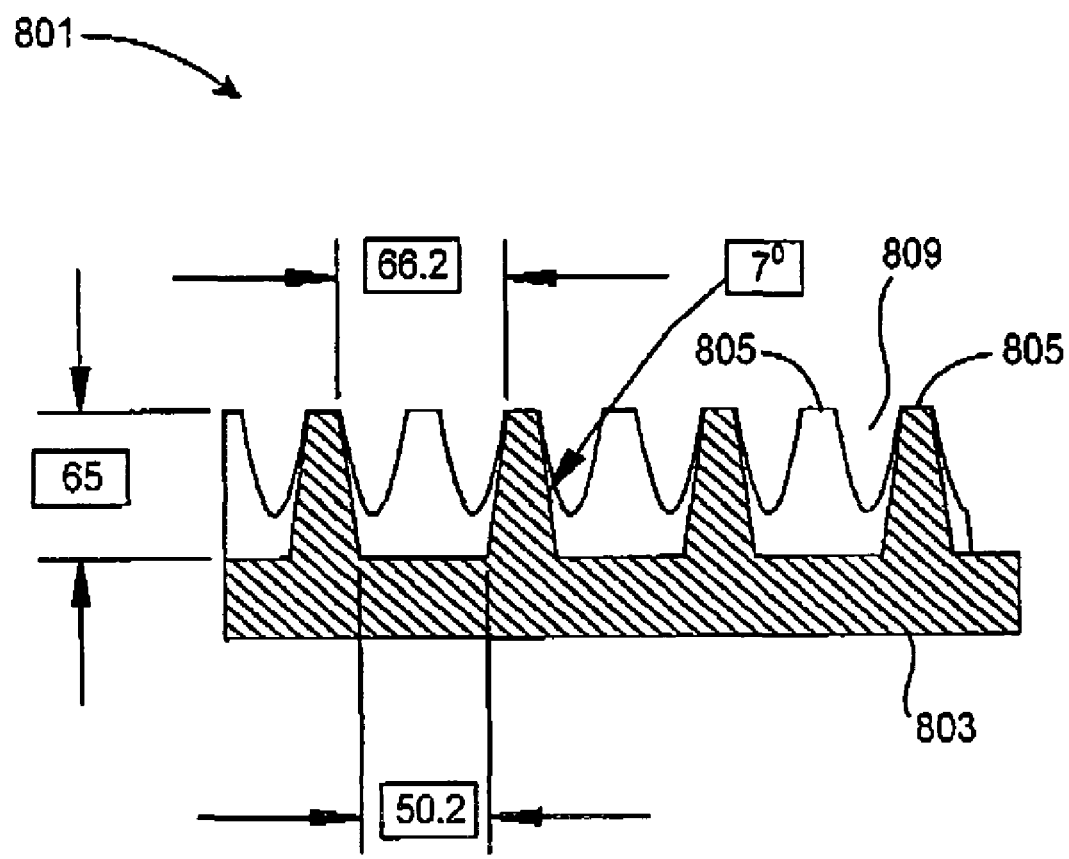
FIG. 8C shows a cross-sectional view of the matrix presented in FIG. 8A.

A variation of a matrix configuration with a square pack design is illustrated in FIGS. 8A-8C. In this variation the posts defining the cell arrangement are tapered, such that they have a larger diameter at the bottom and a smaller diameter at the top. FIG. 8A provides an isometric view of a matrix structure in accordance with this embodiment. FIG. 8B provides a top view and FIG. 8C provides a cross-sectional view of this structure along the A-A axis respectively. The numbering of matrix elements is analogous to the matrix structure shown in FIGS. 5A-B. The example dimensions of matrix elements are given for spheres having a diameter of about 50 μm. As it can be seen from FIG. 8C the cells defined by the tapered posts have a bottom diameter of about 50.2 μm and a top diameter of about 66.2 μm. The posts can be tapered at about 7°. The design with tapered posts improves the manufacturability of the matrix and can offer a higher contrast, especially when a matrix with a high reflectivity (e.g., white matrix) is used.

A number of alternative designs can be implemented in combination with the square pack design as described above. As it will be understood by one of skill in the art, the matrix pattern can be scaled to a sphere of desired size, as necessary. Further in one embodiment higher walls (e.g. walls having height of at least about 1.5 of sphere diameter) can be used. As it was described, such design may allow for translational movement of the spheres resulting in higher display contrast. Further, higher walls can allow a top seal display assembly process, in which the adhesive envelopes the top of the post during and after the attachment of the front electrode layer. According to another embodiment, the matrix can be segmented into several regions which are not in fluid communication with one another. For example, a solid wall may be placed in the matrix between about every 5-50 rows.

Figure 9A:
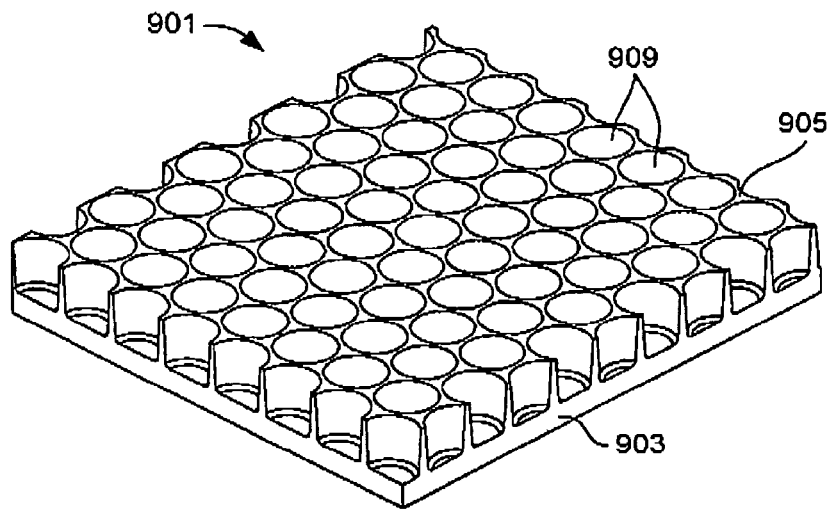
FIG. 9A shows an isometric view of a matrix structure illustrating a hexagonal close pack of matrix cells without a channel in accordance with an embodiment of the invention.
Figure 9B:
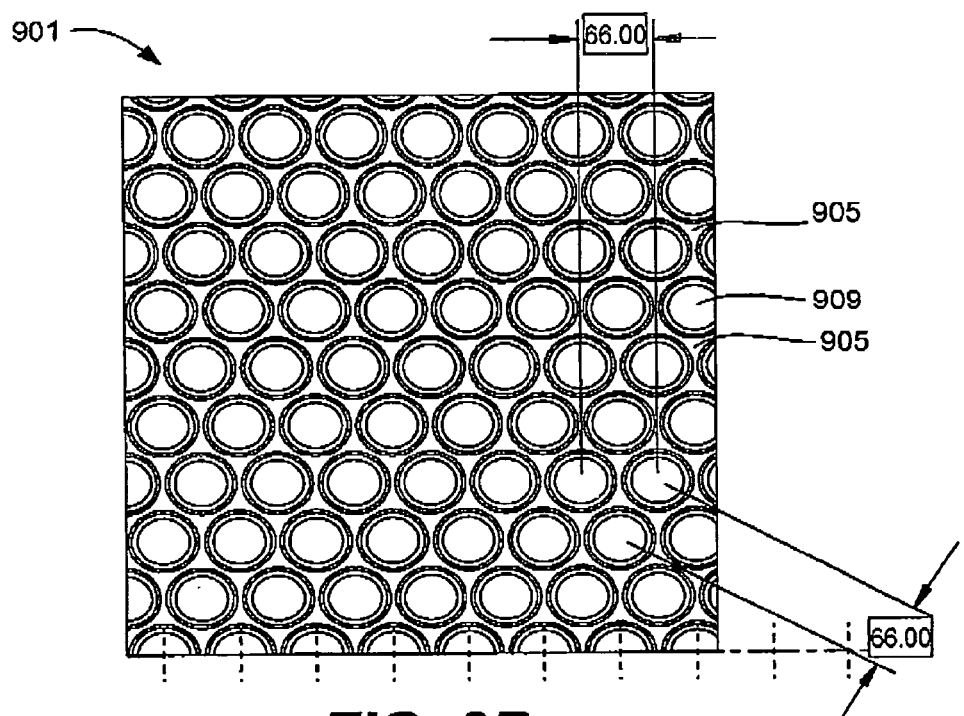
FIG. 9B shows a top view of the matrix structure presented in FIG. 9A.
Figure 9C:
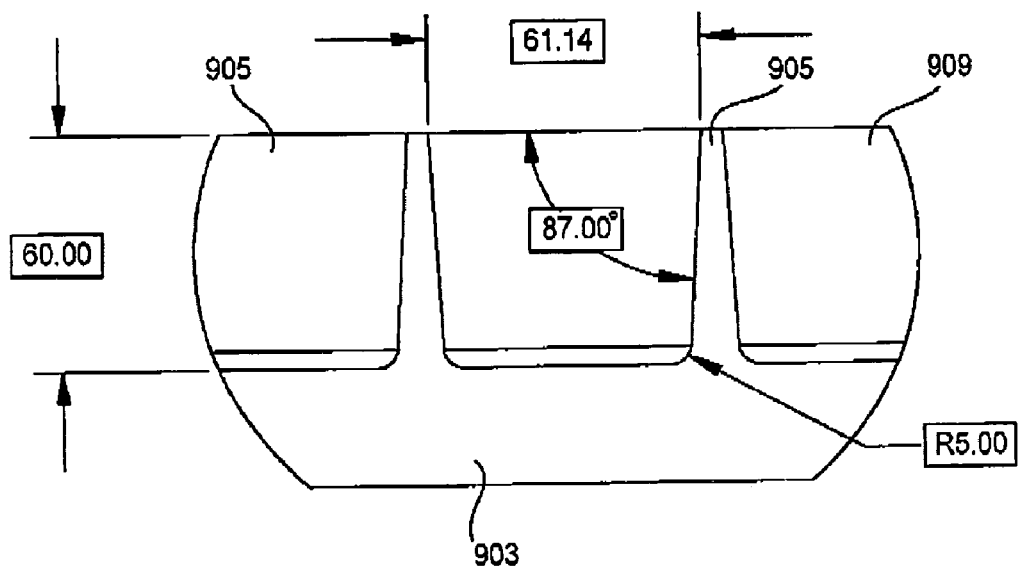
FIG. 9C shows a cross-sectional side view of individual cells of the matrix presented in FIG. 9A.

A matrix configuration employing a hexagonal close pack design without a channel is illustrated in FIGS. 9A-9C. FIG. 9A provides an isometric view of a matrix structure in accordance with this embodiment. FIG. 9B provides a top view of the matrix and FIG. 9C provides a cross-sectional view of an individual cell in this structure. The numbering of matrix elements is analogous to the numbering used in FIGS. 5A-5B. The absence of a channel in this design allows the walls of the structure to extend all the way to the top of the front electrode layer. This design maximizes the wall area and results in increased structural stability of the formed device. Further, this design provides a large wall area available for attachment of the front electrode layer and, therefore, provides a more robust device. In addition, when the matrix with high reflectivity is employed (e.g., a white matrix), this design provides a very bright display, which is typically superior in brightness to the displays based on matrix designs employing a channel.

In an example embodiment the matrix designed to host spheres having a diameter of about 50 µm, has a closest center-to-center cell separation of about 66 µm, a cell height of about 60 µm. The cells may be tapered with the largest cell diameter of about 61 µm at the top of the cell. It is understood that the dimensions can be scaled and modified to accommodate spheres having different sizes. Further, this design may be modified in a variety of ways, e.g., higher cell walls may be employed to enable translational movement of the spheres.

Figure 10A:
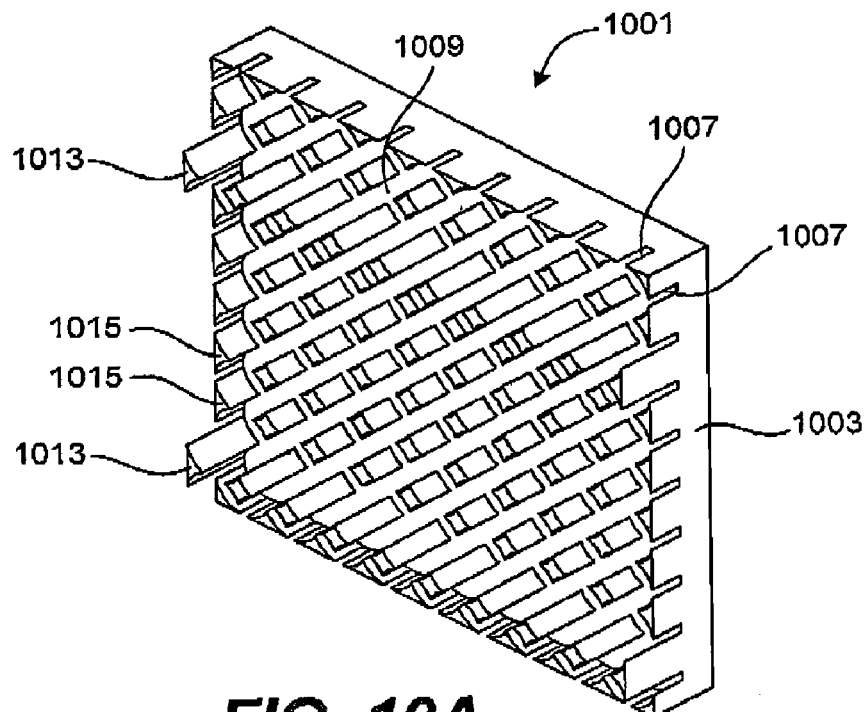
FIG. 10A shows an isometric view of a matrix structure illustrating a square close pack of matrix cells with parallel and perpendicular channels and with cell walls having different heights in accordance with an embodiment of the invention.
Figure 10B:
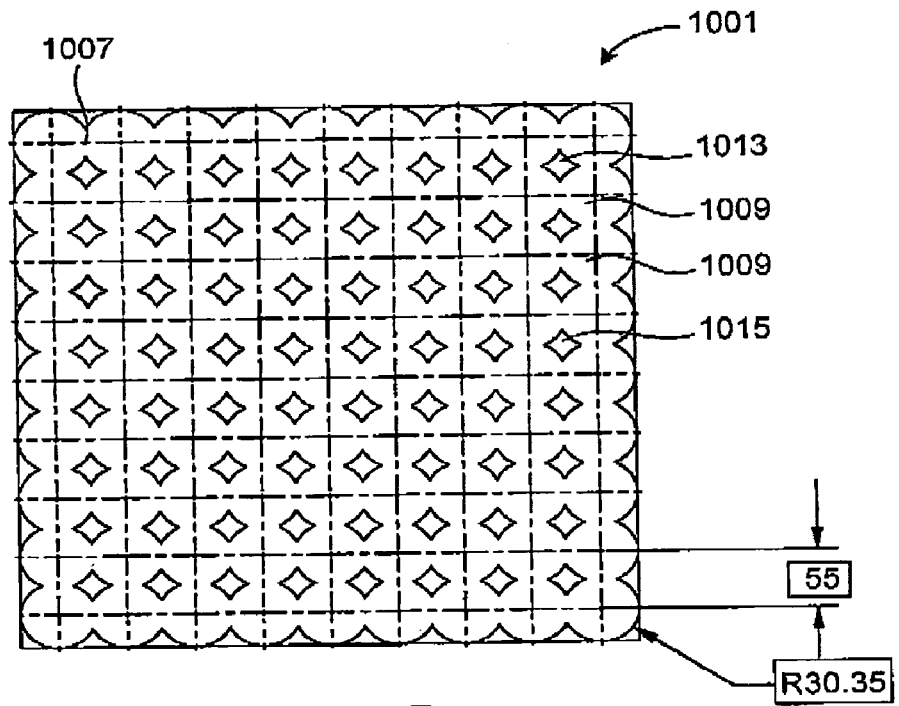
FIG. 10B shows a top view of the matrix structure presented in FIG. 10A.
Figure 10C:
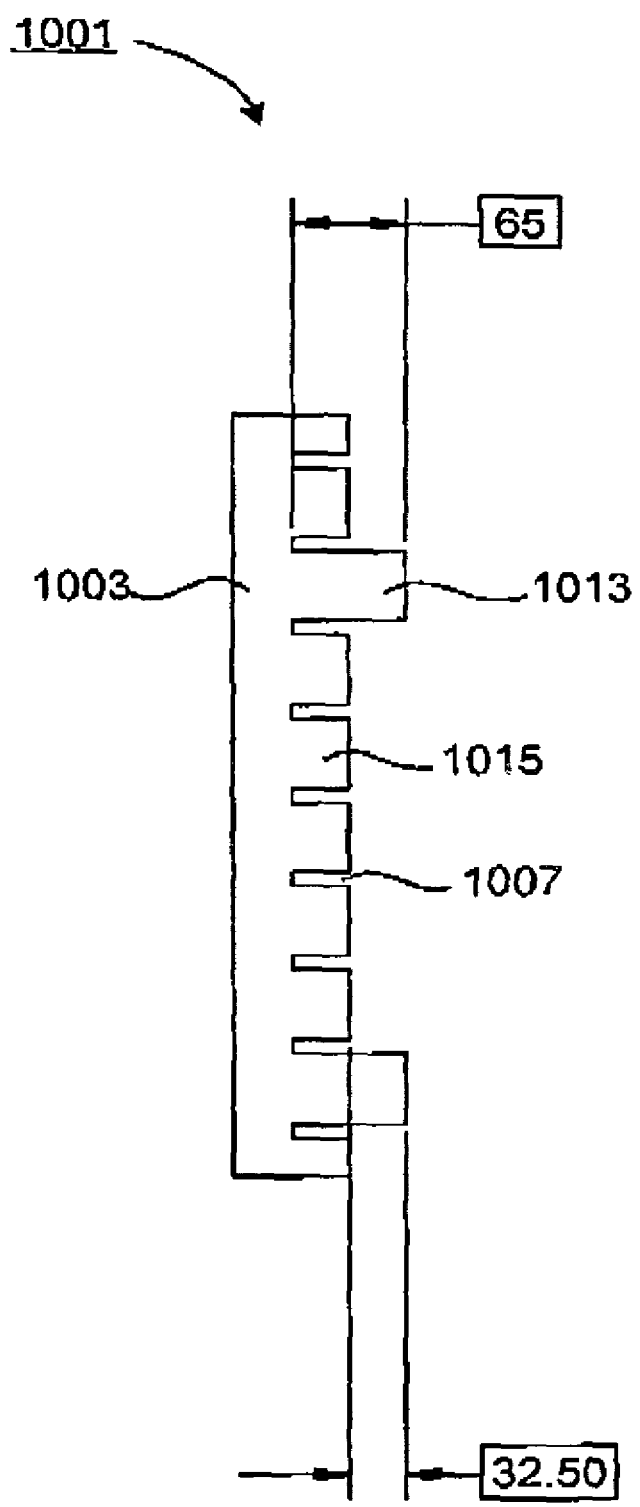
FIG. 10C shows a cross-sectional side view of the matrix presented in FIG. 10A.

A matrix configuration employing a close pack square design with multi-height posts is illustrated in FIGS. 10A-10C. FIG. 10A provides an isometric view of a matrix structure in accordance with this embodiment. FIG. 10B provides a top view of the matrix and FIG. 10C provides a cross-sectional view of the matrix structure. The numbering of matrix elements is analogous to the numbering used in FIGS. 7A-7B. In addition, instead of same-height posts, the structure includes tall supporting posts 1013 and short arranging posts 1015. The function of supporting posts is to serve in the attachment of the matrix to the front electrode layer and to thereby support the structural integrity of the formed device. The function of the arranging posts is to define the arrangement of the cells, such as to define a square pack design. While it is important to have a certain fraction of the tall posts to maintain structural integrity of the device, it is also advantageous to have short posts, because the short posts minimize the interaction between the walls and rotating spheres. Further, a matrix having a fraction of short posts exhibits a more facile fluid communication, which is often desirable in the display manufacturing process. As it can be seen from FIG. 10A, this structure allows for free fluid communication between the cells through the intersecting channels 1007. In some embodiments the display structure contains at least about 30%, e.g., at least about 50% of short arranging posts 1015. The short posts can have a height of less than about 0.8 of the sphere diameter, preferably a height equal to about a sphere radius and less. In general, the short arranging posts can have any height which allows them to serve as arranging elements in the matrix, e.g., direct the spheres into a particular packing arrangement.

In an example embodiment the matrix designed to host spheres having a diameter of about 50 µm, has a closest center-to-center cell separation of about 55 µm, a cell height of about 65 µm, defined by the height of the tall posts, and a cell barrier height of about 30 µm, defined by the height of short posts. It is understood that the dimensions can be scaled and modified to accommodate spheres having different sizes. Further, this design may be modified in a variety of ways, e.g., higher cell walls may be employed to enable translational movement of the spheres, the matrix may be segmented into regions having no fluid communication with one another, etc.

Figure 11A:
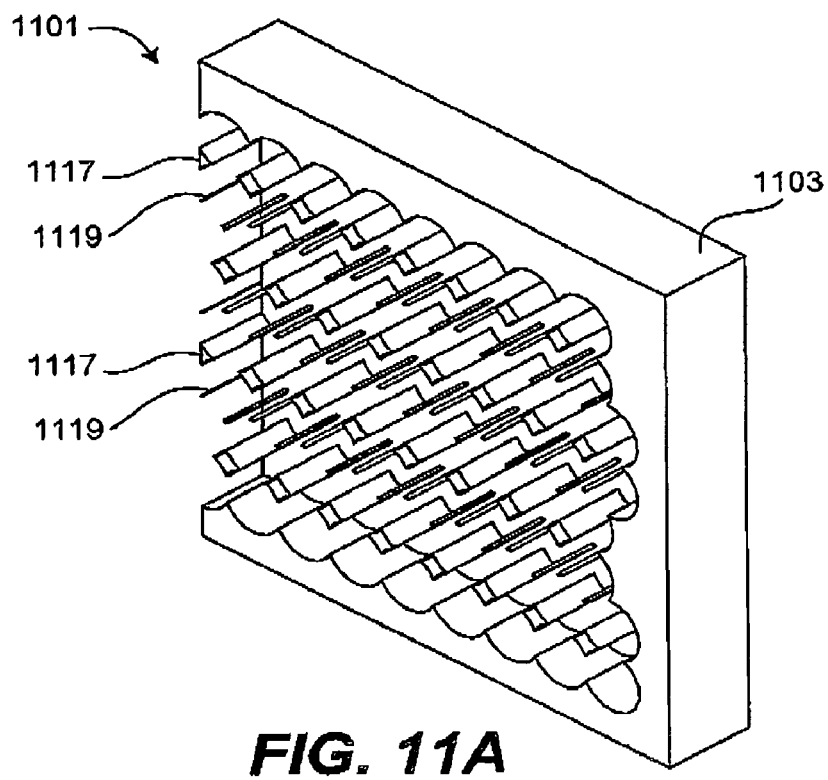
FIG. 11A shows an isometric view of a matrix structure illustrating a combination of a square close pack and a hexagonal close pack of matrix cells in one matrix in accordance with an embodiment of the invention.
Figure 11B:
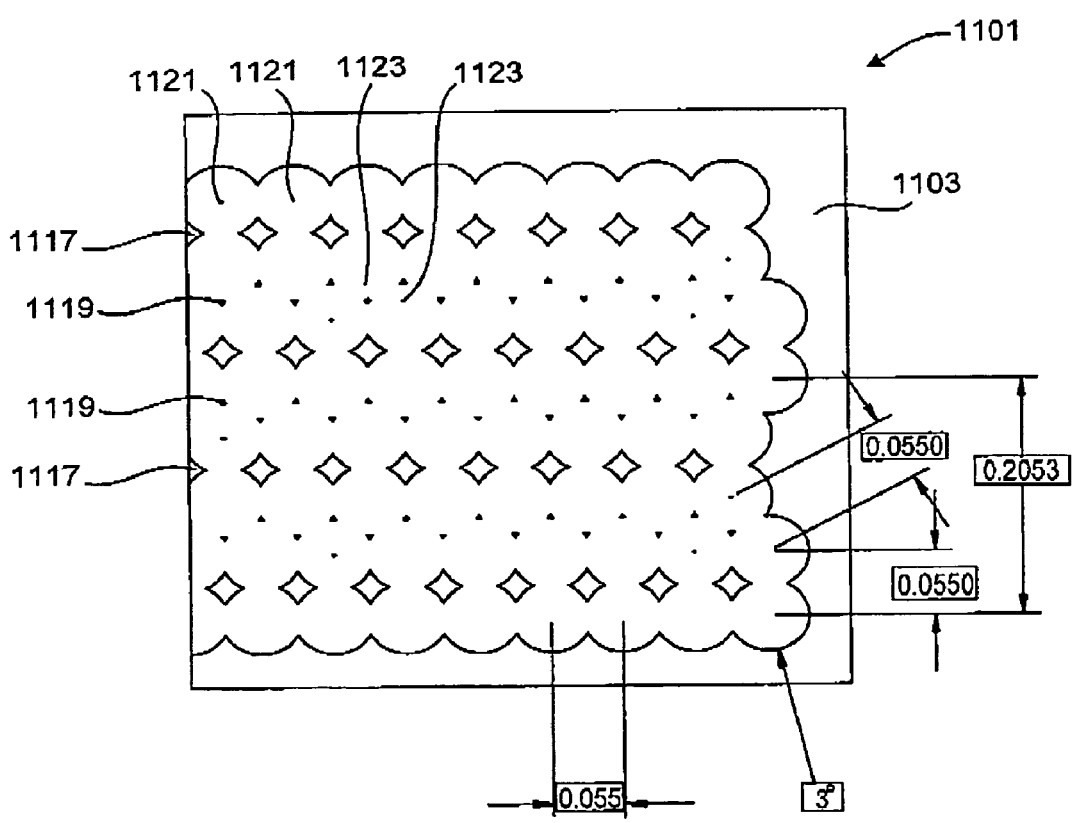
FIG. 11B shows a top view of the matrix structure presented in FIG. 11A.
Figure 11C:
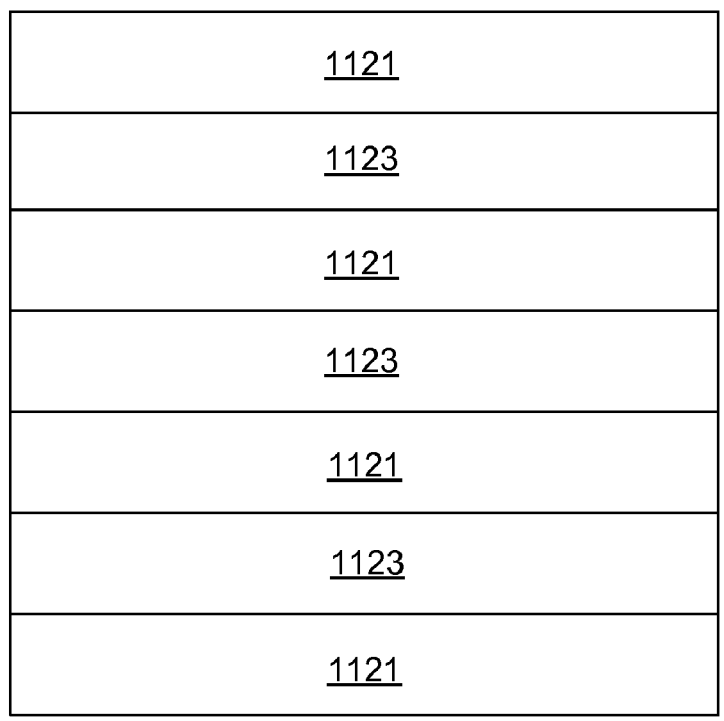
FIG. 11C shows a schematic top view of the matrix structure presented in FIG. 11A, illustrating alternating regions of a square close pack and a hexagonal close pack of matrix cells in a matrix.

A matrix configuration employing a combination of hexagonal and square packs is illustrated in FIGS. 11A-11B. FIG. 11A provides an isometric view of a matrix structure in accordance with this embodiment. FIG. 11B provides a top view of the matrix. FIG. 11C provides a schematic top view of the matrix. The numbering of matrix elements is analogous to the numbering used, in FIGS. 7A-7B. In addition, instead of identical posts and identical cells, the structure includes square pack posts 1117 defining square pack cells 1121 and hexagonal pack posts 1119 defining hexagonal pack cells 1123. The matrix is designed to have alternating regions of square pack cell arrays and hexagonal pack cell arrays. Because of such combination, this matrix design can achieve high structural stability characteristic of a square pack, and high fill factor characteristic of a hexagonal pack. FIG. 11C schematically shows alternatin regions of square pack cell arrays 1121 and hexagnal pack cell arrays 1123.

In an example embodiment the matrix designed to host spheres having a diameter of about 50 µm, has a closest center-to-center cell separation of about 55 µm both in the hexagonal pack region and in the square pack region. This matrix design can be scaled and modified as necessary. In one exemplary modification of this design the arranging hexagonal pack posts 1119 are eliminated from the structure, such that a plurality of spheres can arrange themselves, preferably in a hexagonal pack without the help of the posts. Only the square pack arranging posts would be left in this structure. In some embodiments the matrix may be segmented into regions (e.g., hexagonally packed regions and regions with square packing) which may be separated from one another by walls to prevent fluid communication between the regions.

Figure 12A:
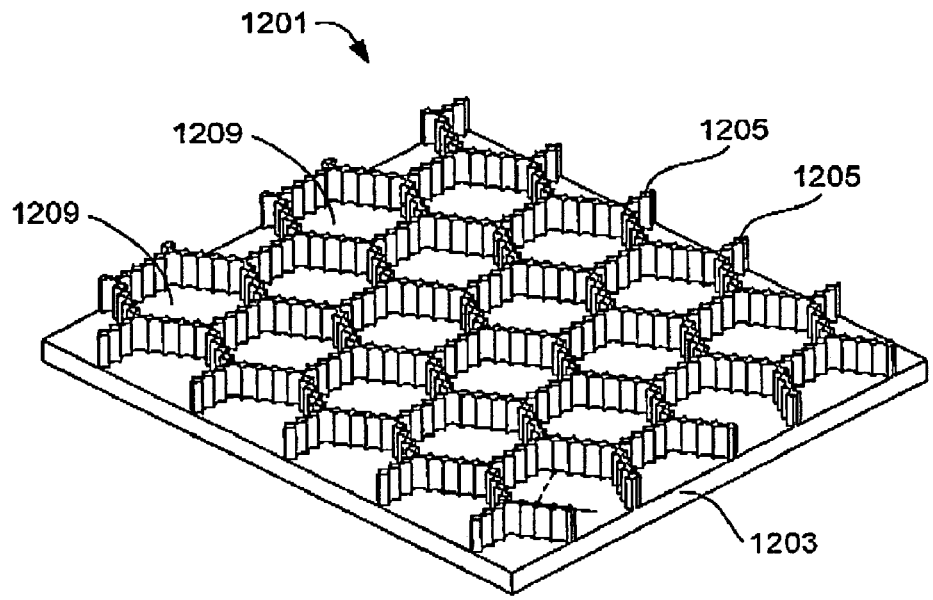
FIG. 12A shows an isometric view of a matrix structure illustrating a hexagonal close pack of matrix cells, in which each cell is designed to accommodate multiple elements, in accordance with an embodiment of the invention.
Figure 12B:
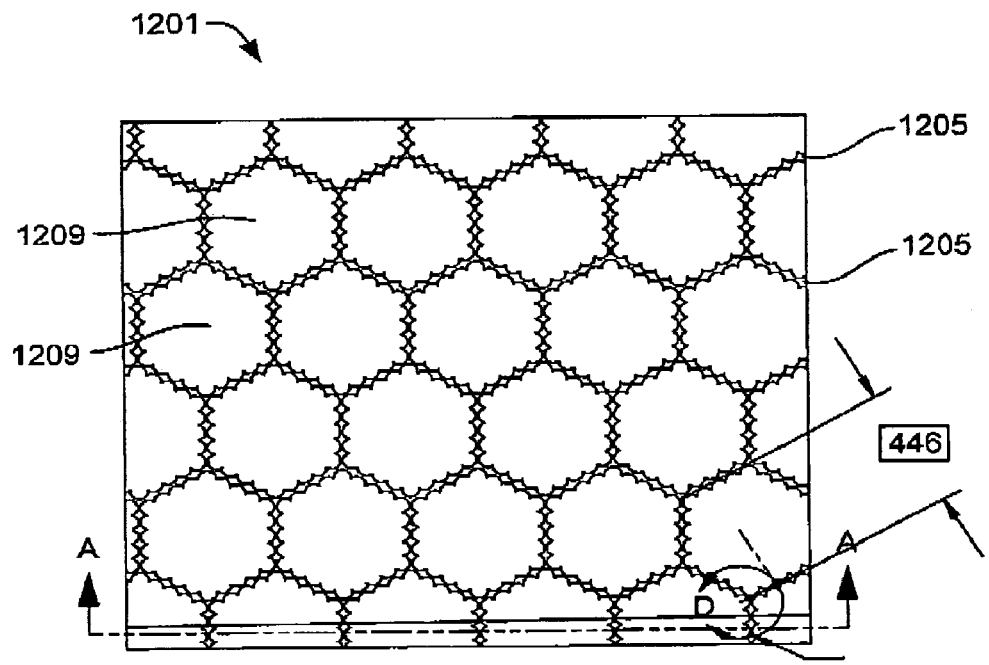
FIG. 12B shows a top view of the matrix structure presented in FIG. 12A.
Figure 12C:
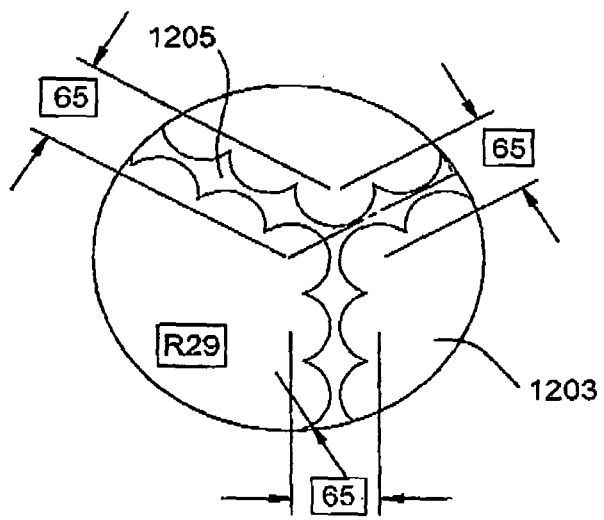
FIG. 12C shows a detailed view of the matrix presented in FIG. 12A.
Figure 12D:
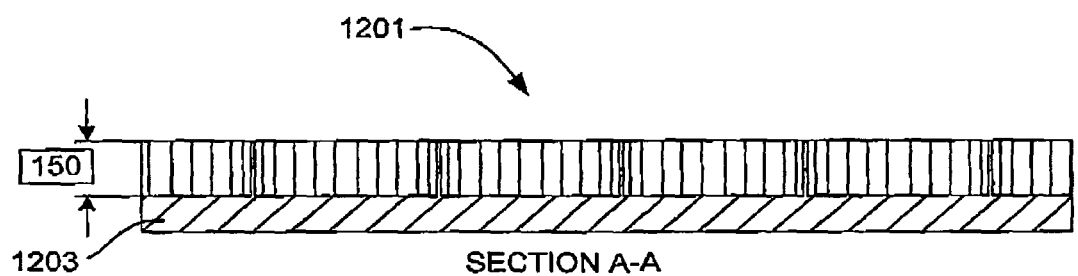
FIG. 12D shows a cross-sectional view of the matrix presented in FIG. 12A.

A matrix configuration employing cells designed to host multiple spheres in a cell is illustrated in FIGS. 12A-12D. In the illustrated configuration the matrix walls are arranged in a hexagonal design. In other embodiments, the walls may be arranged in other designs, e.g., in square, rectangular and rhomboidal designs. FIG. 12A provides an isometric view of a matrix structure in accordance with the hexagonal design embodiment. FIG. 12B provides a top view of this matrix. FIG. 12C provides a detailed view of a matrix portion. FIG. 12D provides a cross-sectional view of a matrix portion. The numbering of matrix elements is analogous to the numbering used in FIGS. 7A-7C. In the described embodiment each matrix cell 1209 can host a plurality of spheres. For example between about 3-1000 spheres can occupy a single cell. Because of the absence of the walls between individual elements residing within one cell, a very high fill factor can be achieved by this design (e.g., at least about 65%). The spheres may be distributed in a monolayer, or multiple layers of spheres (e.g., between about 2-5, preferably 2-3 layers) may be formed. It is often advantageous to use a multi-layer configuration, because the presence of underlying layers under the first viewable layer can fill in the interstitial regions between the spheres of the first viewable layer, thereby resulting in more saturated colors. In the embodiment illustrated in FIGS. 12A-12D, the walls of the matrix are shaped so as to mold to the shape of the spheres residing against them. Such "scalloping" of the walls reduces the interstitial area occupied by the walls and results in a higher fill factor.

In an example embodiment illustrated by FIGS. 12A-12D, the matrix designed to host spheres having a diameter of about 50 μm, has a cell width of about 446 μm, as shown in FIG. 12B. The walls of each cell are scalloped so as to accommodate about 5 spheres against each cell wall in a single layer. The height of the walls is about 150 μm, allowing accommodation of 1-3 layers of spheres per cell. The walls have thickness of about 65 μm at positions of their maximum thickness, as can be seen in the detailed view shown in FIG. 12C. It is understood that the described dimensions are provided as a specific example, and are not intended to limit this matrix design in any way. The dimensions of cells, the type of pack, and other parameters of the matrix can be scaled or otherwise modified as desired. For example, while the illustrated example shows a matrix which does not have a channel, other embodiments of this design may have a plurality of channels (parallel or intersecting) allowing fluid communication between the cells.

One aspect of the present invention relates to the optical properties of the matrix. The matrix, as mentioned above, should preferably have optical properties resembling the properties of the "lighter" hemisphere of the rotating spheres, at least in the viewable region. Therefore, the matrix can be made of, or can be coated with, a light-colored material. In one embodiment, the matrix is coated with the same pigment or other material that imparts the white color to the rotating elements. This material may apply to the entire matrix or just a portion of it such as the front facing portions of the matrix (e.g., the tops of the walls and the bottoms or floors of the cells). Coloring the cell floors of the matrix may be particularly important in designs where there are interstitial regions between the cell walls and the regions covered by the rotating elements. For a display employing white hemispheres on the elements, the matrix color is preferably a highly reflective white material. In alternative embodiments, the matrix may be transparent or even dark, or may match any color or optical property presented by the optical element to the viewer. For example, it may have a blue color when used in conjunction with blue and yellow rotating sphere. For most "paper" applications, however, it will be desirable to provide a maximum amount of whiteness or brightness in the display as viewers find this to be the most comfortable viewing medium. In certain embodiments employing a light or reflective matrix as described here, the overall display front plane will have a white reflectance value of at least about 30%, more preferably about 50% and even more preferably about 70%. Note that a high value of white reflectance may be an important feature as one or more color filters may be provided in front of the front plane in a typical application.

As with all of the materials of the display, the matrix material should be heat-resistant, having a melting point or glass transition point of at least 100° C. Further, its optical properties should not be substantially affected by temperature in the preferred temperature range. The matrix material should also be essentially non-conductive. Those portions of matrix material that come into contact with the dielectric fluid should be resistant to it, so that the properties of both the matrix and the fluid are not substantially altered during their long-term contact. Generally, the matrix material should be reasonably flexible to afford easy manufacturing and allow rugged treatment during end use. Generally, it should have a hardness that allows it to withstand normal use but should not be too brittle to impact manufacturability. In certain embodiments, the material will have a durometer of between about 40 shore A and 75 shore D. A variety of materials with these characteristics can be used for matrix fabrication. For example, the matrix can be fabricated from materials used in hot embossing fabrication technique. Examples of these materials include heat resistant acrylic polymers (e.g. polymethylmethacrylate (PMMA)), polyethylene terephthalate (PET), poly(ether ether ketone)s (PEEK), acrylonitrile butadiene styrene (ABS), polystyrene, polypropylene, polyetherimide (PEI), cyclo-olefin polymers (e.g. a cyclo-olefin polymer sold under the trademark ZEONOR® available from Zeon Chemicals of Louisville, Ky.), or Ultem available from GE Plastics of Pittsfield, Mass., and UV-curable epoxy. In one embodiment, polycarbonate (PC) is a preferred material. As indicated, such materials may include or be coated with a white pigment, such as $TiO_2$.

Hot embossing technique is especially suitable for matrix fabrication, since it allows fabrication of high aspect ratio features on the scale of several microns or even nanometers (nano-embossing). Such a technique can provide a matrix with high aspect ratio walls, a feature that is not easily attainable by other microfabrication techniques. In hot embossing, a mold is first manufactured by standard photolithography and dry etching techniques, such as those employed in the semiconductor industry. The matrix mold is the negative image of the matrix. The actual matrix is embossed when the molding force is applied to the matrix material under high temperature. A particular range of forces and temperatures depends on a particular material that is used. In one embodiment, embossing is performed at a temperature which is slightly higher (e.g., 10-40° C. higher) than the glass transition temperature of the polymeric material being embossed. For example, when polycarbonate is used as a matrix material, hot embossing can be conducted at a temperature of about 180° C., which is slightly higher than the glass transition temperature of polycarbonate ($T_g$=150° C.), and at a pressure of about 400-500 psi, e.g., about 450 psi. The polymeric material can be subjected to high temperature and pressure for seconds to several minutes, during which time it flows and adopts a shape of the master mold. Higher pressure and temperature will typically shorten the embossing time. As indicated, this technique allows fabrication of features having high aspect ratios (e.g. higher than about 8:1) and dimensions of several microns (e.g., 5-10 μm). The matrix material can be brought into contact with the embossing mold by many different techniques such as a roll to roll technique, or die set. Alternately an injection molded embossing can be implemented utilizing standard injection molding plastics machinery.

Display Assembly Methods

Figure 13A:
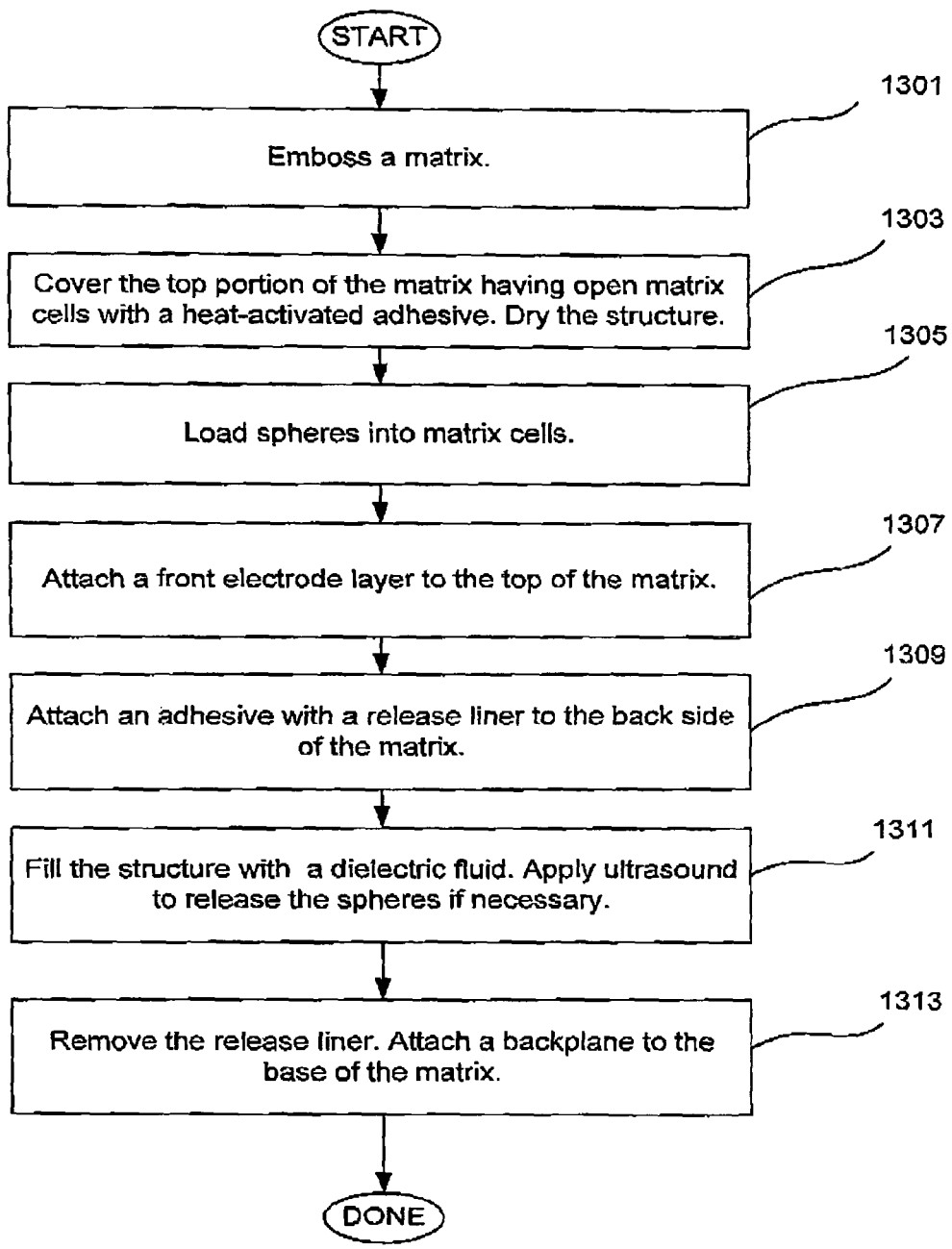
FIG. 13A presents a possible process flow diagram for a method of assembly of a twisting element display.
Figure 13B:
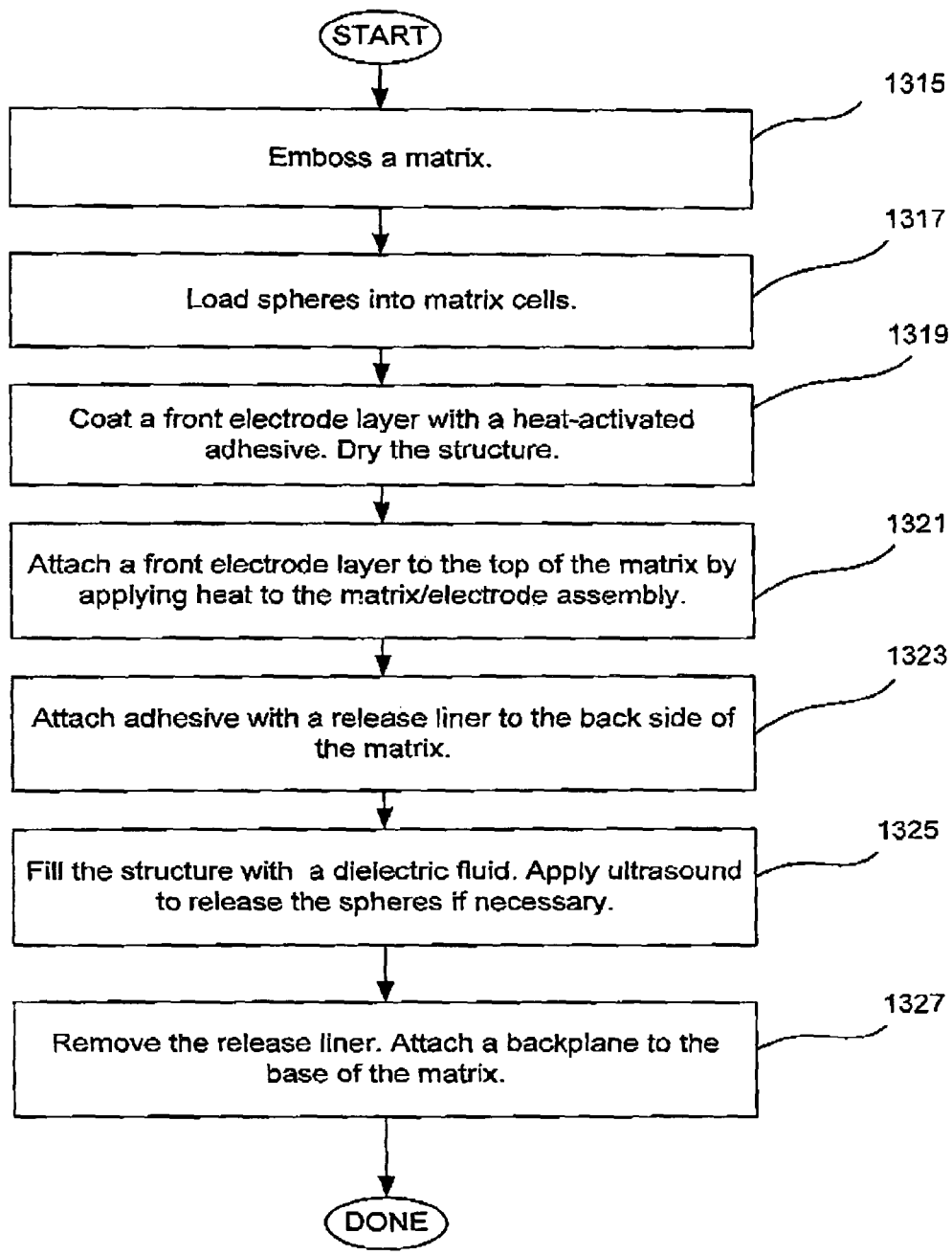
FIG. 13B presents another possible process flow diagram for a method of assembly of a twisting element display.

The display structure can be assembled, for example, by following process flow diagrams shown in FIGS. 13A and 13B. According to FIG. 13A, in the first operation, 1301, the matrix is fabricated by an embossing technique. The matrix can be embossed, for example, by hot embossing or by UV embossing. The matrix is embossed to provide a matrix cell depth that is greater than the diameter of a sphere that the cell will host.

In the next operation 1303, the top portion of the matrix is covered by a heat-activated adhesive, by, for example, a roll transfer method. The structure may then be thoroughly dried, and loaded with spheres in an operation 1305. In one example, the spheres are dispensed onto the top of the matrix in excess and are loaded into the cells of the matrix with the use of vibration. Other methods of loading the spheres will be described in detail below. After the spheres have been loaded, the front electrode layer, such as an ITO PET layer with an anti-glare coating, is brought into contact with the adhesive-coated matrix and is attached to the top of the matrix utilizing the heat activated adhesive, as shown by operation 1307. This operation typically requires heating of the partially fabricated structure to a temperature of at least about 70°, e.g., such as 140° C. Next, in an operation 1309, an adhesive with a release liner is attached to the back of the matrix. This adhesive will serve to attach the matrix to the backplane of the display. A pressure-sensitive adhesive (PSA) is typically used between the liner and the matrix base. The release liner can be removed, when necessary, to expose an adhesive-covered bottom portion of the matrix base, so that a backplane could be attached to it when needed. When attached, the release liner protects the adhesive layer, and does not allow it to interfere with other operations of the process. It is noted that attachment of the adhesive-coated release liner can be performed at various stages during display fabrication and may depend on a particular matrix fabrication process. For example, when the matrix is made from a UV curable material, which is subject to UV embossing, the embossing operation 1301 can be performed by embossing a matrix on top of an adhesive-covered release liner. In those embodiments, when a hot embossing method is used, the release liner with adhesive is preferably attached after the matrix has been embossed to avoid exposure of the adhesive to high temperature.

After the release liner has been attached in operation 1309, the partially fabricated structure can be cut to a desired size. Then, the structure is filled with a dielectric fluid in an operation 1311. The fluid is introduced through side openings into the matrix channels, in those embodiments where the matrix has a channel. The partially fabricated front plane structure can be first evacuated, and the fluid can be aspirated into the structure when the vacuum is released. The sides of the structure are then sealed, affording a completely fabricated front plane of the display. At this point ultrasound may be applied to the front plane structure to release the spheres which may be attached to the walls of the cells due to the presence of electrostatic charge. For those embodiments, in which the matrix does not have a channel the cells are filled with the fluid prior to operation 1307, e.g., after the spheres have been loaded. The front electrode layer is then attached as described above, and the structure is sealed. After the sealed front plane of the display is formed, the release liner can be removed and any industry-standard or specialized backplane can be attached to the base of the matrix, as shown in operation 1313, thereby providing a finished display product. It is noted that a particular sequence of operations shown in FIGS. 13A and 13B need not necessarily be followed, and alternative sequences of operations may be performed, or some operations may be added or omitted.

An alternative method of display assembly is illustrated by the process flow diagram presented in FIG. 13B. This process differs from the process described above in that the heat-activated adhesive is applied to the front electrode layer, rather than to the top of the matrix. This is more advantageous because the presence of adhesive on the matrix can interfere with the sphere loading process. Thus, in some embodiments, it is advantageous to load spheres into the clean matrix in order to avoid contamination with the adhesive. According to the process flow shown in FIG. 13B, the matrix is fabricated by embossing the desired matrix in an operation 1315. The top portion of the embossed matrix containing cell openings is clear of adhesive and is exposed. The spheres are then loaded into the matrix cells in an operation 1317. In an independent operation 1319, which may be performed before or after operations 1315-1317, the front electrode layer is coated with a heat-activated adhesive. For example, an optically clear adhesive can be laminated onto ITO coated PET. Next, in an operation 1321, the adhesive-coated front electrode layer (e.g., ITO PET) is attached to the top portion of the matrix by applying heat to the matrix/electrode assembly which activates the adhesive. Then, an adhesive with a release liner is attached to the back portion of the matrix in an operation 1323 and the partially fabricated display is cut to a desired size. The structure is then filled with a dielectric fluid in an operation 1325 and the edges of the matrix are sealed to contain the fluid. After the cells are filled with fluid, ultrasound may be optionally applied to release the spheres from the cell walls. Next, in an operation 1323 the release liner is removed and a backplane is attached to the base of the matrix to provide a display structure.

Figure 14:
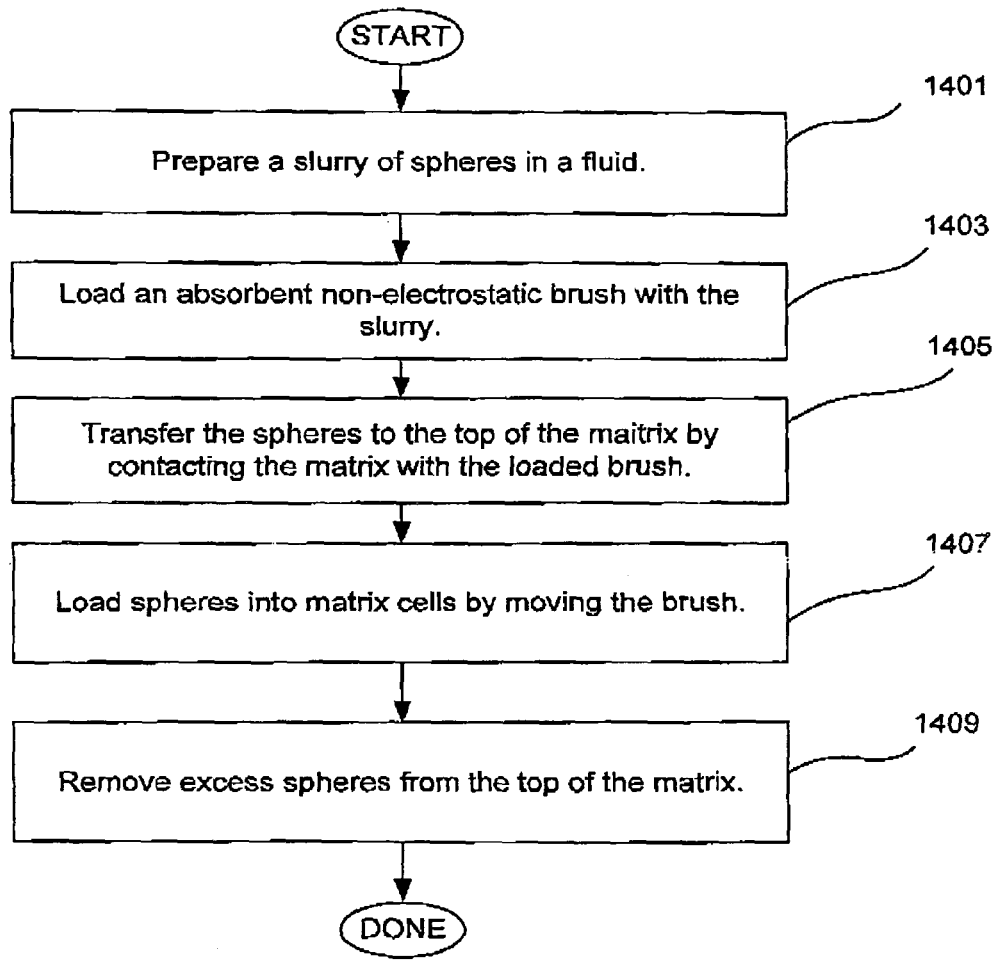
FIG. 14 presents a process flow diagram for a method of loading the optically anisotropic elements into the matrix of an electro-optic display in accordance with one embodiment.

One of the challenging operations of the display assembly process is the operation of loading the spheres into the cells. Because of the small size of the spheres (typically less than 1 mm in diameter), small size of the matrix cells, and the tendency for aggregation exhibited by small spheres, it is often difficult to load the spheres into the matrix by dry loading methods. According to one aspect of the invention, a method for loading spheres into the matrix is provided. An example process diagram for this method is shown in FIG. 14. The process starts by preparing a slurry of spheres in a fluid in an operation 1401. For example, the same dielectric fluid which will be later used to fill in the cells, may be employed, to minimize contamination. Next an absorbent member (e.g., a brush) is loaded with the slurry in an operation 1403. It is often preferable, but not always required that the brush material is non-electrostatic and does not significantly change the charge of the spheres. While the use of brush is often preferable, other absorbent members, such as sponges may be used in some embodiment. The spheres are then transferred to the top of the matrix by contacting the matrix with the loaded absorbent member (e.g., brush) in an operation 1407. The spheres are then loaded into the matrix cells by moving the absorbent member against the matrix in an operation 1407. Next, excess spheres are removed from the top of the matrix in an operation 1409, e.g., by swiping the spheres off with a second absorbent member (e.g., a second brush). The provided method achieves efficient transfer of spheres into the matrix cells and can be used to fill any matrix type, including matrices that host one sphere per cell, and matrices designed to host multiple spheres in a cell.

The methods illustrated in FIGS. 13A-B and 14 describe fabrication of electro-optic displays having new types of front plane configurations. These front planes can be used in conjunction with a variety of back planes, as will be appreciated by one of skill in the art.

In one embodiment, the backplane is provided on a flexible substrate. In some cases, it will be desirable to employ backplane circuitry fabricated at least in part using solution phase processing. In other words, the conductive lines and/or the active switching elements (e.g., transistors and/or diodes) are formed from materials deposited in solution phase. Such materials may be printed on a backplane substrate. As explained in US Published Patent Application No. 2004-0179146, filed Jan. 16, 2004 (which is incorporated herein by reference for all purposes), at least some of the conductive or semiconductive materials employed in a backplane may be doped or undoped organic materials such as a polyacetylene, a poly(phenylene), a poly(phenylene vinylene), a polyfluorene, a polythiophene, a polycyclopentadithiophene, a polyaniline, a poly(ethylenedioxythiophene), and a polypyrrole.

Overall, the front plane of the display can have a thickness of less than about 300 μm, preferably less than about 150 μm, while the complete display structure which includes the backplane can have thickness of between about 250 μm and 500 μm. This thickness is comparable to the thickness of paper, and allows the display to be flexible and lightweight.

Method of Use

The rotating element display is suitable for displaying both still and moving images. The images are created by providing signals to display electrodes (e.g., back plane electrodes) in the addressable electrode matrix. The signals can selectively address specific electrodes, wherein each electrode allows independent control of a discrete region of the display. For example, each electrode can control one or multiple rotating elements. A potential difference between the front and back electrodes is created in response to the signal, causing the addressed rotating elements to flip and change the pixel color presented to the viewer.

The signals can control the magnitude and polarity of the voltage applied to individual electrodes, as well as the duration of electrical pulses. Therefore, the signals can addressably control the response of individual elements or groups of elements on the display. For example, the signal can determine whether the addressed element should rotate or not, and if it should rotate, the degree of rotation may be also controlled by the provided signal, utilizing pulse width modulation (PWM). Still and moving images can be thus created on the rotating element display. In one embodiment, the inventive display possesses bistability. In this embodiment, still images can be maintained on the display without change in the absence of electrical input from electrodes or other signals.

Other Embodiments

It is understood that the examples and embodiments described herein are for illustrative purposes only and that various modifications or changes in light thereof will be suggested to persons skilled in the art. Although various details have been omitted for clarity's sake, various design alternatives may be implemented. Therefore, the present examples are to be considered as illustrative and not restrictive, and the invention is not to be limited to the details given herein, but may be modified within the scope of the appended claims.

For example, while it is advantageous for some applications that electro-optic displays possess bistability, in other embodiments (e.g., in embodiments directed to video applications), the displays of present invention may not necessarily be bistable. Further, while reflective displays were primarily described in the examples provided in the detailed description, it should be realized that the displays of present invention are not limited to reflective displays and can also include displays that may be transmissive, may employ back-light or employ light-emitting elements.

What is claimed is:

1. A rotating element display comprising:
  (a) a back plane comprising a plurality of electrodes distributed in two dimensions on the backplane, wherein each electrode allows independent control of a discrete region of the display; and
  (b) a front plane comprising:
    a first side connected to or proximate said back plane;
    at least one electrode on a second side of the front plane opposite said back plane;
    a matrix comprising a plurality of cells defined by walls in the matrix, wherein the matrix comprises a region in which the cells are arranged in a square close packed pattern and a region in which the cells are arranged in a hexagonal close packed pattern, wherein said regions alternate within the matrix;
    a plurality of optically anisotropic elements disposed in said plurality of cells; and
    a fluid provided in said cells, such that said elements can rotate from a first orientation to a second orientation within their respective cells when an electric field is applied to the cells.

2. The display of claim 1, wherein the anisotropic elements comprise a core and a hemispherical coating.

3. The display of claim 1, wherein the matrix comprises a plurality of channels, each connecting a plurality of cells along a path.

4. The display of claim 3, wherein the plurality of channels are substantially parallel to one another.

5. The display of claim 3, wherein the channels are arranged to allow the fluid to be drawn into the front plane during assembly of the front plane.

6. The display of claim 3, wherein the plurality of channels are substantially perpendicular to one another.

7. The display of claim 1, wherein at least some of the matrix walls are posts.

8. The display of claim 1, wherein at least one cell in the matrix is in fluid communication with each of its adjacent cells.

9. The display of claim 8, wherein the matrix comprises a plurality of areas, wherein the cells within the same area are in fluid communication with one another, and the cells from different areas are separated from one another by a wall preventing fluid communication between adjacent areas of the matrix.

10. The display of claim 9, wherein each area comprises between about 2-100 rows of cells.

11. The display of claim 1, wherein the matrix comprises walls having different heights.

12. The display of claim 11, wherein the matrix comprises supporting walls and arranging walls, wherein the supporting walls have a height of at least equal to a height or a diameter of an optically anisotropic element, and wherein the arranging walls have a height of less than 80% of the height or a diameter of an optically anisotropic element.

13. The display of claim 1, wherein the height of the cells allows for a translational movement of an optically anisotropic element in a cell in a direction defined by the first and second sides of the front plane.

14. The display of claim 1, wherein a height of a cell is at least about 1.1 times greater than a height or a diameter of an optically anisotropic element residing in the cell.

15. The display of claim 1, wherein one optically anisotropic element resides in a cell.

16. The display of claim 1, wherein more than 1 optically anisotropic element resides in a cell.

17. The display of claim 16, wherein one layer of optically anisotropic elements resides in a cell.

18. The display of claim 16, wherein between about 2-5 layers of optically anisotropic elements resides in a cell.

19. The display of claim 1, wherein the fluid is a dielectric fluid.

20. The display of claim 1, wherein an area projected by the cells on the second side of the front plane occupies at least about 65% of a corresponding area of the second side.

21. The display of claim 1, wherein the walls that define cells of the matrix have a minimum width at regions separating adjacent cells of at most about 13% of the diameter or width of the cells.

22. The display of claim 1, wherein the walls that define cells of the matrix have a minimum width at regions separating adjacent cells of at most about 35% of the diameter or width of the cells.

23. The display of claim 22, wherein the walls, at positions of their greatest height and least width, have an average aspect ratio of less than about 5:1 (height to width).

24. The display of claim 1, wherein the walls, at positions of their greatest height and least width, have an average aspect ratio of at least about 5:1 (height to width).

25. The display of claim 1, wherein the walls, at positions of their greatest height and least width, have an average aspect ratio of at least about 8:1 (height to width).

26. The display of claim 1, wherein the optically anisotropic elements have at least two colors, and wherein when said elements are in the first orientation one color is presented to the second side of the front plane and when said elements are in the second orientation a different color is presented to the second side of the front plane.

27. The display of claim 26, wherein the at least two colors are black and white.

28. The display of claim 26, wherein one color of the at least two colors is lighter than a second color of the at least two colors.

29. The display of claim 26, wherein at least a portion of the matrix visible through the second side of the front plane is white.

30. The display of claim 29, wherein the white reflectance of the display is at least about 30%.

31. The display of claim 1, wherein the rotating elements are spheres.

32. The display of claim 31, wherein the spheres have an average diameter of between about 25 and 150 micrometers.

33. The display of claim 32, wherein the cells have a center-to-center separation distance of between about 20 and 200 micrometers.

34. The display of claim 1, wherein the plurality of electrodes on the backplane are substantially coplanar.

35. The display of claim 1, wherein the matrix comprises at least one channel and said channel has a cross sectional area of at least about 5% of the cross-sectional area of the cell.

36. The display of claim 1, wherein the matrix comprises at least one channel and said channel does not span the entire height of the channel wall.

37. A front plane for an electro-optic display comprising:
a first side adapted for electrical communication with a backplane;
at least one electrode on a second side of the front plane opposite said back plane;
a matrix comprising a plurality of cells defined by walls in the matrix, wherein at least viewable portions of the matrix are white, wherein the matrix comprises a region in which the cells are arranged in a square close packed pattern and a region in which the cells are arranged in a hexagonal close packed pattern, wherein said regions alternate within the matrix; and
a plurality of electrically responsive elements disposed in said plurality of cells.

38. The front plane of claim 37, wherein the white reflectance of the display is at least about 30%.

39. The front plane of claim 38, further comprising a fluid provided in said cells, such that said elements can rotate from a first orientation to a second orientation within their respective cells when an electric field is applied to the cells.

40. The front plane of claim 37, wherein the matrix cells are not in fluid communication with one another.

41. The front plane of claim 37, wherein each matrix cell comprises a plurality of the elements.

42. The front plane of claim 37, wherein
the matrix comprises a plurality of cells defined by walls in the matrix wherein said walls have an average aspect ratio of at least about 5:1 (height to width).

43. The front plane of claim 42, wherein the walls have an average aspect ratio of at least about 8:1 (height to width).

44. The front plane of claim 43, wherein the walls that define cells of the matrix have a minimum width at regions separating adjacent cells of at most about 20% of the diameter or width of the cells.

45. The front plane of claim 44, wherein the walls that define cells of the matrix have a minimum width at regions separating adjacent cells of at most about 10% of the diameter or width of the cells.

46. The front plane of claim 37, wherein the optically anisotropic elements comprise a core and a hemispherical coating.

47. The front plane of claim 37, wherein the matrix comprises at least one channel through at least some of the walls and connecting at least some of the cells with one another.

48. The front plane of claim 37, wherein the matrix comprises a plurality of channels each connecting a plurality of cells along a path.

49. The front plane of claim 37, wherein the optically anisotropic elements are bichromal spheres.

50. The front plane of claim 37, wherein the matrix comprises a plurality of channels which are substantially parallel to one another 51. The front plane of claim 50, wherein the channels are arranged to allow the fluid to be drawn into the front plane during assembly of the front plane.

52. The front plane of claim 37, wherein at least some of the matrix walls are posts.

53. The front plane of claim 37, wherein the matrix comprises a plurality of areas, wherein the cells within the same area are in fluid communication with one another, and the cells from different areas are separated from one another by a wall preventing fluid communication between adjacent areas of the matrix.

54. The front plane of claim 53, wherein each area comprises between about 2-100 rows of cells.

55. The front plane of claim 37, wherein the matrix comprises walls having different heights.

56. The front plane of claim 37, wherein one optically anisotropic element resides in a cell.

57. The front plane of claim 37, wherein the electrically responsive elements are rotatable particles.

58. The front plane of claim 57, wherein the rotatable particles are optically anisotropic.

59. The front plane of claim 37, wherein the electrically responsive elements are configured for translational movement.

60. The front plane of claim 59, wherein the electrically responsive elements are monochromal.

* * * * *